United States Patent
Tamura et al.

(10) Patent No.: US 6,711,892 B2
(45) Date of Patent: Mar. 30, 2004

(54) EXHAUST GAS PURIFIER FOR INTERNAL COMBUSTION ENGINES

(75) Inventors: Yasuki Tamura, Tokyo (JP); Kojiro Okada, Tokyo (JP); Tomohiro Ohashi, Tokyo (JP); Naoto Yamada, Tokyo (JP); Kazuo Koga, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/276,824

(22) PCT Filed: Feb. 26, 2002

(86) PCT No.: PCT/JP02/01730

§ 371 (c)(1),
(2), (4) Date: Nov. 18, 2002

(87) PCT Pub. No.: WO02/068807

PCT Pub. Date: Sep. 6, 2002

(65) Prior Publication Data

US 2003/0115854 A1 Jun. 26, 2003

(30) Foreign Application Priority Data

Feb. 26, 2001 (JP) .......................................... 2001-050521
Sep. 21, 2001 (JP) .......................................... 2001-288415

(51) Int. Cl.[7] ................................................. F01N 3/00
(52) U.S. Cl. ............................. 60/277; 60/276; 60/285; 60/292
(58) Field of Search .......................... 60/274, 276, 277, 60/278, 279, 285, 286, 297, 301, 311; 73/23.2, 23.31, 23.32; 204/424, 425, 426

(56) References Cited

U.S. PATENT DOCUMENTS

| 5,732,552 | A | * | 3/1998 | Matsumoto et al. ........... 60/277 |
| 5,767,386 | A | * | 6/1998 | Lemire et al. .............. 73/23.32 |
| 5,974,787 | A | * | 11/1999 | Lemire et al. ............... 60/277 |
| 6,082,176 | A | * | 7/2000 | Kondo et al. ................ 204/424 |
| 6,138,453 | A | * | 10/2000 | Sawada et al. ............... 60/277 |
| 6,233,927 | B1 | | 5/2001 | Hirota et al. |
| 6,381,952 | B1 | * | 5/2002 | Asanuma et al. ............. 60/277 |
| 6,477,830 | B2 | * | 11/2002 | Takakura et al. ............ 60/292 |

FOREIGN PATENT DOCUMENTS

| EP | 0976915 A2 | 2/2000 |
| JP | 3-117611 A | 5/1991 |
| JP | 4-183921 A | 6/1992 |
| JP | 8-303290 A | 11/1996 |
| JP | 9-125940 A | 5/1997 |
| JP | 2000-45755 A | 2/2000 |

* cited by examiner

Primary Examiner—Thomas Denion
Assistant Examiner—Tu M. Nguyen
(74) Attorney, Agent, or Firm—Birch, Stewart, Kolasch & Birch, LLP

(57) ABSTRACT

An exhaust passage (20) of an internal-combustion engine (1) is provided with an exhaust emission control unit (40) capable of reducing harmful substances in exhaust gas under a given exhaust pressure condition and an exhaust sensor (22) for detecting the concentration of a specific exhaust component ($H_2$, $O_2$) in the exhaust gas, and a performance lowering identifying unit identifies lowering of the performance of the exhaust emission control (40) by detecting a failure to fulfill the given exhaust pressure condition in accordance with the output of the exhaust sensor.

12 Claims, 19 Drawing Sheets

FULLY CLOSED    FULLY OPEN

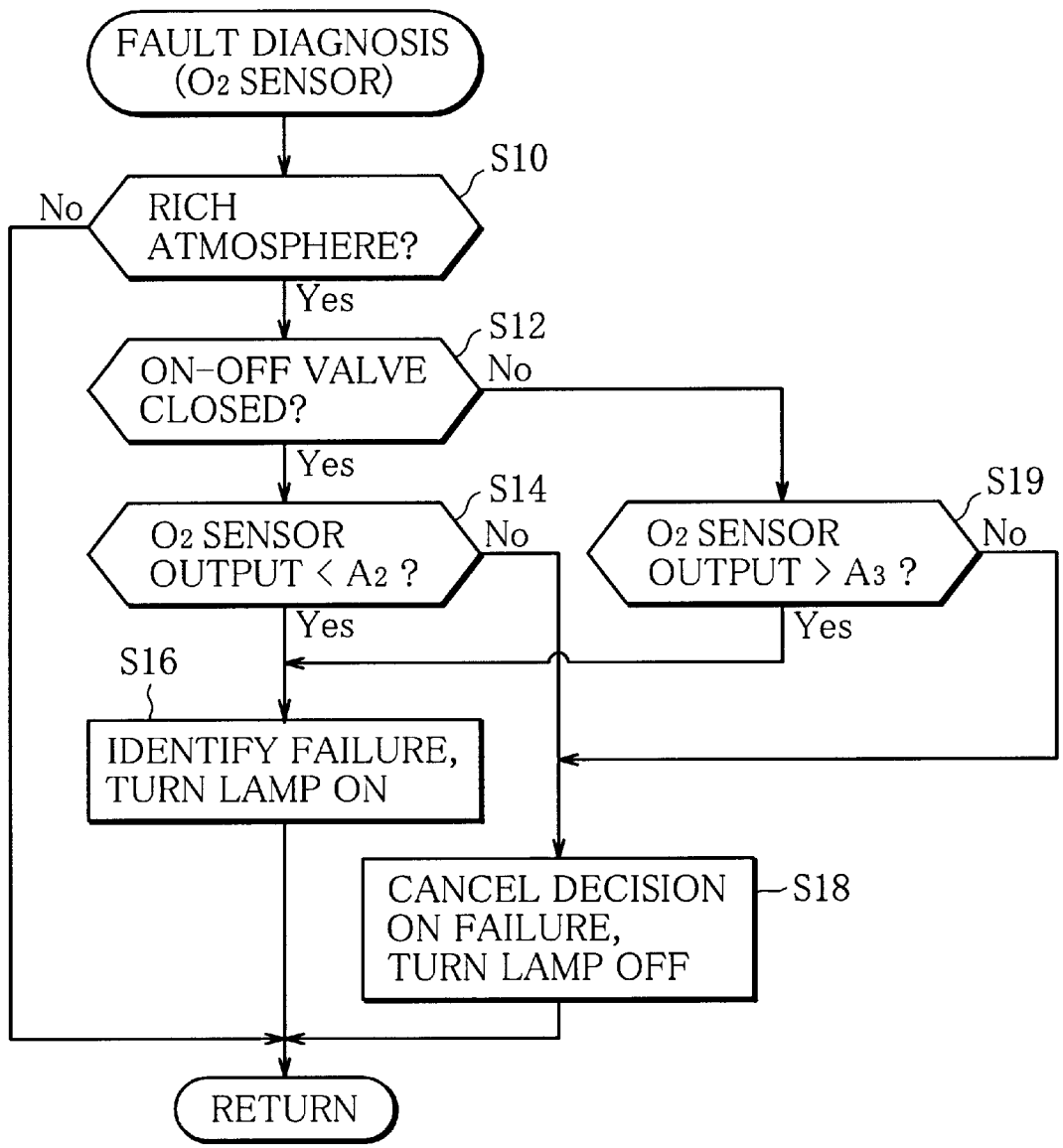

TARGET A/F (TARGET EXCESS AIR FACTOR $\lambda t$)

EXHAUST GAS PURIFIER FOR INTERNAL COMBUSTION ENGINES

This application is the national phase under 35 U.S.C. §371 of PCT International Application No. PCT/JP02/01730 which has an International filing date of Feb. 26, 2002, which designated the United States of America.

TECHNICAL FIELD

The present invention relates to an exhaust emission control device of an internal-combustion engine, and more specifically, to a technique for identifying lowering of the performance of exhaust emission control means capable of reducing harmful substances in exhaust gas.

BACKGROUND ART

An exhaust emission control technique utilizing reaction on a catalyst is known as a technique that is intended to reduce harmful substances (including smoke, NOx, etc. as well as unburned substances such as HC, CO, $H_2$, etc.) in exhaust gas.

However, this exhaust emission control technique has a problem that the unburned substances including HC and the like are discharged into the atmosphere before the catalyst in a cold state is activated.

Described in Jpn. Pat. Appln. KOKAI Publications Nos. 3-117611 and 4-183921, therefore, is a developed technique such that the exhaust pressure is raised to activate the catalyst early.

According to this technique, a closed variable-flow valve is provided on the lower-stream side of an exhaust passage, for example. By adjusting the closed variable-flow valve to change the sectional area of the exhaust passage, the exhaust resistance and exhaust density can be increased, or the exhaust flow rate can be lowered to increase the exhaust pressure and exhaust gas temperature.

If the exhaust gas pressure is increased in this manner, individual performances can be enhanced in the cases where unburned substances are fed into an exhaust system (two-stage fuel injection, etc.), EGR (exhaust gas recirculation) is carried out, and exhaust air-fuel ratio modulation (exhaust A/F modulation) is carried out. Thus, reaction of the unburned substances in the exhaust passage including a combustion chamber is accelerated to raise the exhaust gas temperature, so that the catalyst is activated early enough to promote purification of the exhaust gas drastically.

Since the closed variable-flow valve is placed in a high-temperature, high-pressure environment, it sometimes may go wrong and cease to operate normally after prolonged use.

If the valve of the closed variable-flow valve thus ceases to operate normally, the valve may not be able to be closed, so that the actual exhaust pressure fails to rise, although the exhaust pressure is expected to be increased. Otherwise, the valve may be left closed inevitably to keep the exhaust pressure high, although the exhaust pressure is not expected to be increased.

Accordingly, there is an idea of providing an exhaust pressure sensor in the exhaust passage and detecting something abnormal about exhaust control means, such as the closed variable-flow valve, in accordance with exhaust pressure information that is detected by means of the exhaust pressure sensor.

On other hand, exhaust gas that is discharged from a diesel engine that is mounted in a vehicle contains plenty of particulate matter (abbreviated PM) as well as HC, CO, etc.

A diesel particulate filter (abbreviated DPF) for capturing the PM and removing it by combustion by means of an external heat source or the like is practically used as a post-exhaust processor of the diesel engine.

Thus, noises and error factors other than the exhaust pressure that are involved in the output signal of the exhaust sensor can be eliminated by obtaining the relations between a plurality of pieces of output information with different exhaust component concentrations (exhaust A/F's) from the exhaust sensor and a plurality of target outputs with the individual exhaust component concentrations (individual exhaust A/F's) under the reference pressure (e.g., atmospheric pressure or the like), e.g., the ratios between the differences between a plurality of exhaust outputs and the differences between a plurality of target outputs. By doing this, the exhaust pressure can be estimated more properly. Lowering of the performance of the exhaust emission control means, which can reduce the harmful substances in the exhaust gas under the given exhaust pressure condition, can be accurately identified by monitoring the relations between the outputs of the exhaust sensor and the target outputs.

The PM captured and deposited on the filter should preferably be removed by combustion to regenerate the filter before the PM capture limit is reached, and the exhaust pressure on the upper-stream side of the post-exhaust processor rises depending on the quantity of the PM deposited on the filter. In consideration of this fact, as is described in Jpn. Pat. Appln. KOKAI Publication No. 8-303290, for example, the exhaust pressure sensor is provided in the exhaust passage on the upper-stream side of the post-exhaust processor so that the PM can be removed by combustion on the assumption that the PM capture limit is approached when a given exhaust pressure is reached by the exhaust pressure that is detected by means of the exhaust pressure sensor.

In the case where the exhaust pressure sensor is used in this manner, however, the exhaust pressure sensor must be provided separately. In general, an exhaust pressure sensor has a specification such that it can resist high temperature and high pressure, it is expensive, and therefore, the parts cost is high.

DISCLOSURE OF THE INVENTION

The object of the present invention is to provide an exhaust emission control device of an internal-combustion engine, whereby lowering of the performance of exhaust emission control means, which can reduce harmful substances in exhaust gas, can be securely identified at low cost.

In order to achieve the above object, an exhaust emission control device according to the present invention comprises exhaust emission control means located in an exhaust passage of an internal-combustion engine and capable of reducing harmful substances in exhaust gas under a given exhaust pressure condition, an exhaust sensor for detecting the concentration of a specific exhaust component in the exhaust gas, and performance lowering identifying means for identifying lowering of the performance of the exhaust emission control means by detecting a failure to fulfill the given exhaust pressure condition in accordance with the output of the exhaust sensor.

Thus, the exhaust pressure can be estimated in accordance with information from the existing exhaust sensor without separately providing an exhaust pressure sensor, and lowering of the performance of the exhaust emission control means, which can reduce the harmful substances in the exhaust gas under the given exhaust pressure condition, can be securely identified at low cost by monitoring the output of the exhaust sensor and detecting the failure to fulfill the given exhaust pressure condition.

The present invention is based on the following knowledge, which will be described below.

In general, the diffusing speed of each exhaust component increases to raise its partial pressure if the exhaust pressure rises.

On the other hand, the following Nernst formula (1) is generally known as a theoretical formula for an $O_2$ sensor output in the case where the exhaust sensor is an $O_2$ sensor, for example.

"Nernst formula": electromotive force ($O_2$ sensor output)=(gas constant×operating temperature/(4×Faraday constant)×1 n(atmosphere-side $O_2$ partial pressure/exhaust-side $O_2$ partial pressure). (1)

Here the exhaust-side $O_2$ partial pressure is given by the following formula (2):

exhaust-side $O_2$ partial pressure=exhaust pressure×exhaust $O_2$ concentration. (2)

This Nernst formula indicates the following phenomenon. If the exhaust pressure increases, the exhaust-side $O_2$ partial pressure increases to cause the electromotive force ($O_2$ sensor output) to lower on the high-$O_2$ lean-A/F side, while the $H_2$ partial pressure and the exhaust-side $O_2$ partial pressure increases and reduces, respectively, to cause the electromotive force ($O_2$ sensor output) to grow on the high-$H_2$ rich-A/F side.

This implies that the variation of the exhaust pressure can be detected by monitoring the electromotive force ($O_2$ sensor output) and that something abnormal about the exhaust control means can be detected by comparing the output with a target output under the atmospheric pressure, for example.

In the case where the exhaust sensor is an A/F sensor, moreover, the following pump-current formulas (3) and (4) are generally known as theoretical formulas for the A/F sensor output.

"Pump-current formulas": lean-side pump current (A/F sensor output)=(4×Faraday constant×$O_2$ diffusion constant×sectional area of diffusion passage opening/(gas constant×operating temperature×length of diffusion passage)×(exhaust-side $O_2$ partial pressure–$O_2$ partial pressure on gas detecting chamber side (atmosphere side)), (3)

rich-side pump current (A/F sensor output)=(2×Faraday constant× sectional area of diffusion passage opening/(gas constant×operating temperature×length of diffusion passage)×($H_2$ diffusion constant×exhaust-side $H_2$ partial pressure×CO diffusion constant×exhaust-side CO partial pressure). (4)

Here the pump current on the lean side and the pump current on the rich side are positive (+) and negative (−), respectively, or negative (−) and positive (+), respectively.

These pump-current formulas indicate the following phenomenon. If the exhaust pressure increases, the exhaust-side $O_2$ partial pressure increases to cause the pump current and the A/F sensor output to increase on the high-$O_2$ lean-A/F side, while the $H_2$ partial pressure increases to cause the pump current and the A/F sensor output to increase in the opposite direction and reduce, respectively, on the high-$H_2$ rich-A/F side.

This implies that the variation of the exhaust pressure can be detected by monitoring the pump current (A/F sensor output) and that something abnormal about the exhaust control means can be detected by comparing the output with a target output under the atmospheric pressure, for example.

The exhaust sensor may be an NOx sensor, and in this case, the aforesaid pump-current formulas are also applicable as theoretical formulas.

In the exhaust emission control device of the present invention, moreover, the exhaust emission control means includes an exhaust flow control valve capable of adjusting the flow area of the exhaust passage, and the performance lowering identifying means identifies something abnormal about the exhaust flow control valve.

Accordingly, the exhaust pressure rises as the exhaust flow control valve is closed, whereupon reaction of unburned substances in the exhaust passage is accelerated to increase the exhaust gas temperature. Thus, a catalyst is activated early, so that the exhaust emission control efficiency is improved. As this is done, the exhaust pressure can be estimated in accordance with information from the existing exhaust sensor, and something abnormal about the exhaust flow control valve can be securely identified at low cost by monitoring the output of the exhaust sensor.

In the exhaust emission control device of the present invention, moreover, the performance lowering identifying means identifies lowering of the performance of the exhaust emission control means by comparing the output from the exhaust sensor and a target output with the same exhaust component concentration under a reference pressure.

Thus, the exhaust pressure can be properly estimated with ease by comparing the output information from the exhaust sensor and the target output with the same exhaust component concentration (same exhaust A/F) under the preset reference pressure (e.g., atmospheric pressure or the like). Lowering of the performance of the exhaust emission control means, which can reduce the harmful substances in the exhaust gas under the given exhaust pressure condition, can always be satisfactorily identified by monitoring the respective comparative values of the output of the exhaust sensor and the target output.

In the exhaust emission control device of the present invention, moreover, the performance lowering identifying means identifies lowering of the performance of the exhaust emission control means in accordance with relations between a plurality of outputs with different exhaust component concentrations from the exhaust sensor and a plurality of target outputs with the individual exhaust component concentrations under the reference pressure.

Thus, noises and other error factors than the exhaust pressure that are involved in the output signal of the exhaust sensor can be eliminated by obtaining the relations between a plurality of pieces of output information with different exhaust component concentrations (exhaust A/F's) from the exhaust sensor and a plurality of target outputs with the individual exhaust component concentrations (individual exhaust A/F's) under the reference pressure (e.g., atmospheric pressure or the like), e.g., the ratios between the differences between a plurality of exhaust outputs and the differences between a plurality of target outputs. By doing this, the exhaust pressure can be estimated more properly. Lowering of the performance of the exhaust emission control means, which can reduce the harmful substances in the exhaust gas under the given exhaust pressure condition, can be accurately identified by monitoring the relations between the outputs of the exhaust sensor and the target outputs.

In the exhaust emission control device of the present invention, moreover, the exhaust sensor has a characteristic to detect two or more exhaust component concentrations and is adapted to detect the concentration of at least one specific exhaust component when the exhaust air-fuel ratio is a lean air-fuel ratio and to detect the respective concentrations of other specific exhaust components when the air-fuel ratio is a rich air-fuel ratio.

The exhaust gas contains much $O_2$ with a lean air-fuel ratio and much $H_2$ with a rich air-fuel ratio, for example. If one specific exhaust component ($O_2$ component) with the lean air-fuel ratio and another specific component ($H_2$ component) with the rich air-fuel ratio can be individually detected by means of the exhaust sensor, therefore, the exhaust pressure can always be satisfactorily estimated without regard to the air-fuel ratio, lean or rich. Thus, lowering of the performance of the exhaust emission control means, which can reduce the harmful substances in the exhaust gas under the given exhaust pressure condition, can always be identified in a wide air-fuel ratio range without regard to the air-fuel ratio by monitoring the output of the exhaust sensor.

In the exhaust emission control device of the present invention, moreover, the exhaust emission control means is a post-exhaust processor, and the performance lowering identifying means determines the necessity of regeneration of the post-exhaust processor.

If the quantity of PM deposited on a filter of the post-exhaust processor increases, the exhaust pressure on the upper-stream side of the post-exhaust processor is raised as the filter is clogged. However, the exhaust pressure can be estimated in accordance with information from the existing exhaust sensor without separately providing an exhaust pressure sensor. Thus, the necessity of regeneration of the post-exhaust processor can be securely determined at low cost by monitoring the output of the exhaust sensor.

In the exhaust emission control device of the present invention, moreover, the performance lowering identifying means sets a decision value for determining the necessity of regeneration of the post-exhaust processor in accordance with the operating conditions of the internal-combustion engine and the specific exhaust component concentration, and determines the necessity of regeneration of the post-exhaust processor by comparing the output of the exhaust sensor and the decision value using the same operating conditions and the same exhaust component concentration.

Thus, the exhaust pressure can be properly estimated with ease by comparing the output information from the exhaust sensor and the decision value using the same preset operating conditions and the same exhaust component concentration, and the necessity of regeneration of the post-exhaust processor can always be satisfactorily determined by comparing the respective comparative values of the output of the exhaust sensor and the decision value.

In the exhaust emission control device of the present invention, moreover, the exhaust sensor is an $O_2$ sensor, the post-exhaust processor includes an occlusion-type NOx catalyst, and the performance lowering identifying means determines the necessity of regeneration of the post-exhaust processor when the exhaust air-fuel ratio is adjusted to a rich air-fuel ratio in order to release NOx from the occlusion-type NOx catalyst.

If exhaust pressure increases when the exhaust A/F is a rich air-fuel ratio, the $H_2$ partial pressure increases to cause the $O_2$ sensor output to increase. If the $O_2$ sensor is used because the extent of the change is higher than that of the change of the $O_2$ partial pressure with a lean air-fuel ratio owing to the character of the $O_2$ sensor, the necessity of regeneration of the post-exhaust processor can be securely determined with ease by monitoring the output of the $O_2$ sensor when the exhaust air-fuel ratio is adjusted to a rich air-fuel ratio in order to release NOx from the occlusion-type NOx catalyst.

In the exhaust emission control device of the present invention, moreover, the performance lowering identifying means sets, in accordance with the operating conditions of the internal-combustion engine, a target output under a reference exhaust pressure with the post-exhaust processor nonoperating, sets a decision value for determining the necessity of regeneration of the post-exhaust processor in accordance with the exhaust component concentration, and concludes that regeneration of the post-exhaust processor is necessary if the deviation between the output of the exhaust sensor and the target output exceeds the decision value with the same operating conditions and the same exhaust component concentration.

Thus, the exhaust pressure can be properly estimated with ease by comparing the deviation between the output information from the exhaust sensor and the target output under the preset reference exhaust pressure with the decision value with the same operating conditions and the same exhaust component concentration, and a high-exhaust-pressure situation that requires regeneration of the post-exhaust processor can be identified with ease by detecting the attainment of the decision value by the deviation.

In the exhaust emission control device of the present invention, moreover, the exhaust sensor is a linear air-fuel ratio sensor, and the performance lowering identifying means determines the necessity of regeneration of the post-exhaust processor when the exhaust air-fuel ratio is a lean air-fuel ratio during injection quantity feedback control using the linear air-fuel ratio sensor and based on the excess air factor of the internal-combustion engine.

When the exhaust A/F is a lean air-fuel ratio, compared with a rich air-fuel ratio, the higher the degree of leanness, the higher the extent of change of the linear air-fuel ratio sensor output that corresponds to the change of the exhaust pressure is. In the case where the linear air-fuel ratio sensor is used, therefore, the necessity of regeneration of the post-exhaust processor can be securely determined with ease by monitoring the output of the linear air-fuel ratio sensor when the exhaust A/F is a lean air-fuel ratio during the injection quantity feedback control based on the excess air factor of the internal-combustion engine.

In the exhaust emission control device of the present invention, moreover, the exhaust sensor is a linear air-fuel ratio sensor, and the performance lowering identifying means determines the necessity of regeneration of the post-exhaust processor when the exhaust air-fuel ratio is a lean air-fuel ratio during exhaust reflux feedback control using the linear air-fuel ratio sensor.

When the exhaust A/F is a lean air-fuel ratio, compared with a rich air-fuel ratio, the higher the degree of leanness, the higher the extent of change of the linear air-fuel ratio sensor output that corresponds to the change of the exhaust pressure is. In the case where the linear air-fuel ratio sensor is used, therefore, the necessity of regeneration of the post-exhaust processor can be securely determined with ease by monitoring the output of the linear air-fuel ratio sensor when the exhaust A/F is a lean air-fuel ratio during the exhaust reflux feedback control.

In the exhaust emission control device of the present invention, moreover, the exhaust sensor is a linear air-fuel ratio sensor, the post-exhaust processor includes an occlusion-type NOx catalyst, and the performance lowering identifying means determines the necessity of regeneration of the post-exhaust processor when the exhaust air-fuel ratio is adjusted to a rich air-fuel ratio in order to release NOx from the occlusion-type NOx catalyst.

Thus, in the case where the linear air-fuel ratio sensor is used, the necessity of regeneration of the post-exhaust processor can be securely determined with ease by monitoring the output of the linear air-fuel ratio sensor when the exhaust A/F is adjusted to a rich air-fuel ratio in order to release NOx from the occlusion-type NOx catalyst as well as when the exhaust A/F is a lean air-fuel ratio.

BRIEF DESCRIPTION OF THE DRAWINGS

FIG. 3 is a flowchart showing a fault diagnosis routine for the case where an $O_2$ sensor according to a first embodiment is used;

BEST MODE FOR CARRYING OUT THE INVENTION

"Fault Diagnosis on Exhaust Flow Control Valve"

Figure 1:
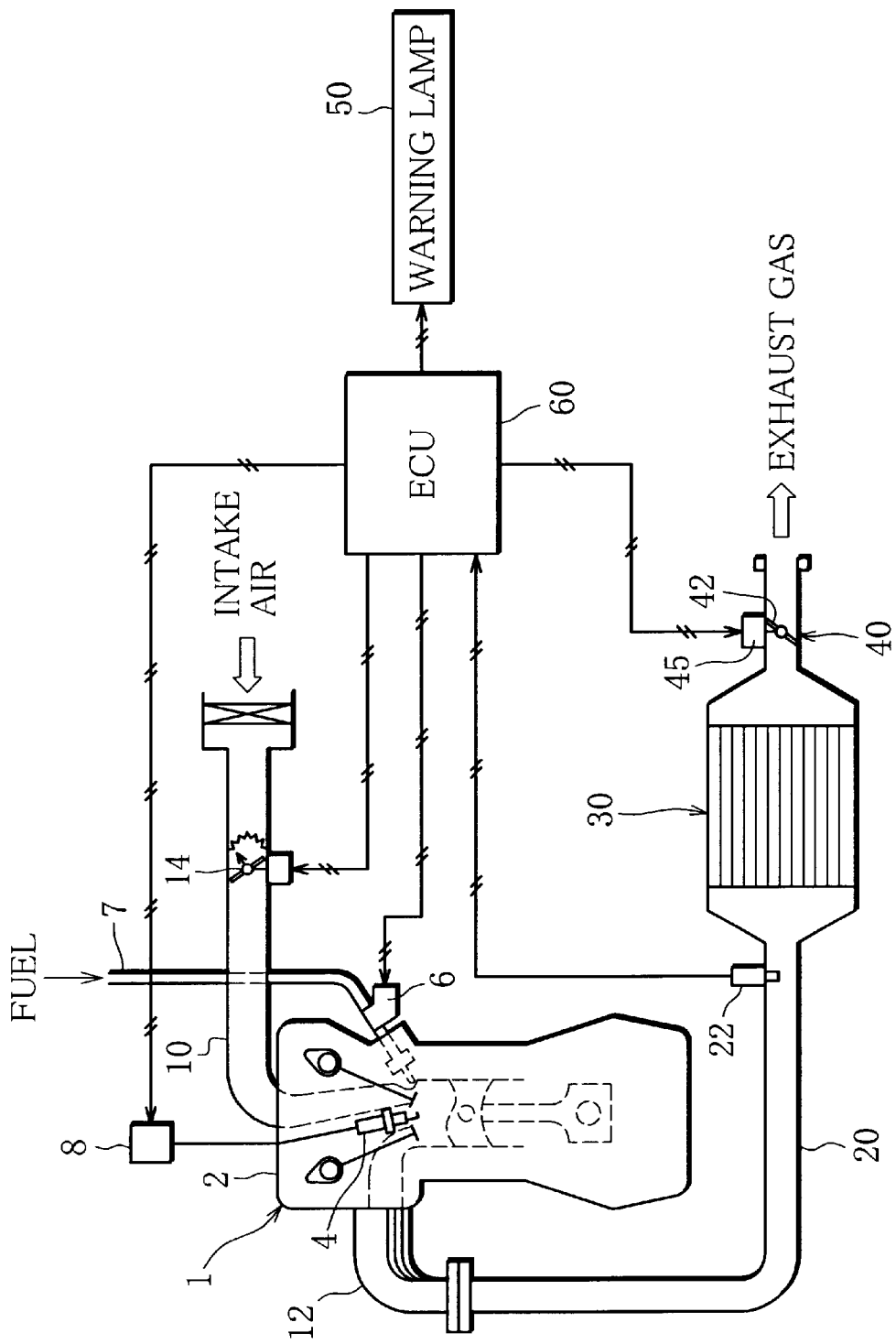
FIG. 1 is a schematic view of an exhaust emission control device of an internal-combustion engine related to fault diagnosis on an exhaust flow control valve of the present invention.

Referring now to FIG. 1, there is shown an outline of an exhaust emission control device of an internal-combustion engine related to fault diagnosis on an exhaust flow control valve of the present invention. The following is a description of the configuration of this exhaust emission control device.

For example, a cylinder-injection spark-ignition gasoline engine is used as an engine 1, an internal-combustion engine. In this engine, fuel injection during a compression stroke (compression-stroke injection) can be carried out together with fuel injection during an intake stroke (intake-stroke injection) by changing the fuel injection mode. This cylinder-injection engine 1 can easily realize operation with a lean air-fuel ratio (lean-A/F operation), besides operation with a theoretical air-fuel ratio (stoichiometric) and operation with a rich air-fuel ratio (rich-A/F operation). In this case, moreover, a four-cylinder engine is used as the engine 1.

As shown in the same drawing, a cylinder head 2 of the engine 1 is fitted with an electromagnetic fuel injection valve 6 along with a spark plug 4 for each cylinder, whereby a fuel can be injected directly into a combustion chamber.

The spark plug 4 is connected with a spark coil 8 that outputs high voltage. Further, the fuel injection valve 6 is connected with a fuel supplier (not shown) having a fuel tank by means of a fuel pipe 7. More specifically, the fuel supplier is provided with a low-pressure fuel pump and a high-pressure fuel pump, whereby the fuel in the fuel tank can be supplied at a low fuel pressure or a high fuel pressure to the fuel injection valve 6, so that the fuel can be injected from the fuel injection valve 6 into the combustion chamber at a desired fuel pressure.

The cylinder head 2 is formed with intake ports for the individual cylinders arranged substantially in the vertical direction and is divergently connected with one end of an intake manifold 10 so as to communicate with each intake port. The intake manifold 10 is provided with an electromagnetic throttle valve 14 that regulates the rate of intake.

Further, the cylinder head 2 is formed with exhaust ports for the individual cylinders arranged substantially in the horizontal direction and is divergently connected with one end of an exhaust manifold 12 so as to communicate with each exhaust port.

Since the cylinder-injection engine 1 is of a known type, a detailed description of its configuration is omitted.

An exhaust pipe (exhaust passage) 20 is connected to the other end of the exhaust manifold 12. The exhaust pipe 20 is fitted with a three-way catalyst 30 for use as an exhaust emission control device. The three-way catalyst 30 has an active noble metal, such as copper (Cu), cobalt (Co), silver (Ag), platinum (Pt), rhodium (Rh), or palladium (Pd), as its carrier.

As shown in the same drawing, moreover, the exhaust pipe 20 is provided with an exhaust sensor 22 for detecting the concentration of a specific exhaust component in exhaust gas.

Further, the exhaust pipe 20 is fitted with an exhaust flow control device 40 in that part thereof which is situated on the lower-stream side of the three-way catalyst 30. The exhaust flow control device 40 is a device that is designed to accelerate reduction of harmful substances (including smoke, NOx, etc. as well as unburned substances such as HC, CO, $H_2$, etc.) in exhaust gas, and is configured to be able to change the exhaust pressure, exhaust gas density, and/or exhaust flow rate. More specifically, the exhaust flow control device 40 is composed of a closed on-off valve (exhaust emission control means, exhaust flow control valve) that can adjust the flow area of the exhaust pipe 20 and is connected electrically to an electronic control unit (ECU) 60.

Figure 2:
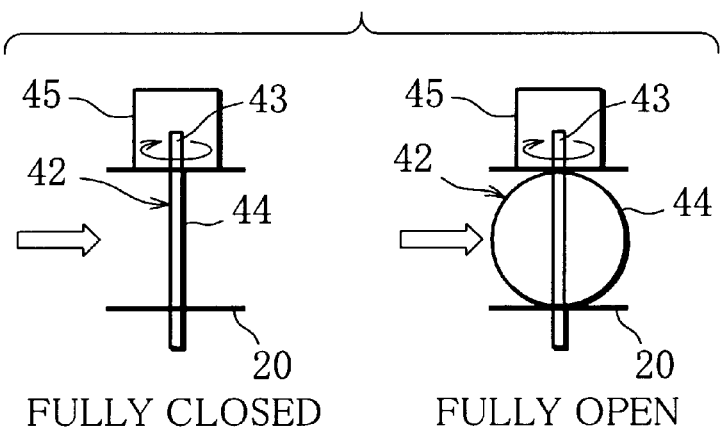
FIG. 2 is a diagram showing a butterfly valve for use as an closed on-off valve.

The closed on-off valve may be any of various types. In this case, a butterfly valve 42 is used that can adjust the flow area of the exhaust pipe 12 by rotating a valve disc 44 around a shaft 43 that penetrates the exhaust pipe 12, as shown in FIG. 2 that illustrates a valve-open state and a valve-closed state. The butterfly valve 42 is provided with an actuator 45, and the butterfly valve 42 is opened or closed as the valve disc 44 is rotated about the shaft 43 by means of the actuator 45.

An ECU 60 is provided with memories (ROM, RAM, nonvolatile RAM, etc.), central processing unit (CPU), timer counter, etc. The ECU 60 carries out comprehensive control of the exhaust emission control device including the engine 1.

The input side of the ECU 60 is connected with the aforesaid various sensors, including the aforesaid exhaust sensor 22, and is supplied with detection information from these sensors.

On the other hand, the output side of the ECU 60 is connected with the aforesaid various output devices, including the fuel injection valve 6, spark coil 8, throttle valve 14, butterfly valve 42, etc. Various pieces of information such as an injection quantity, fuel injection timing, ignition timing, valve opening, etc. that are computed in accordance with the detection information from the various sensors are delivered to the various output devices, individually. Thereupon, an appropriate quantity of fuel is injected from the fuel injection valve 6 at a proper time, spark ignition is carried out at a proper time by means of the spark plug 4, and the on-off valve 42 is opened or closed at a proper time so that a desired valve opening is obtained. Further, a warning lamp 50 is also connected to the output side.

The following is a description of the operation of the exhaust emission control device related to fault diagnosis on the exhaust flow control valve of the present invention constructed in this manner, that is, a method of fault diagnosis on the exhaust flow control device 40 that is composed of the butterfly valve 42.

When the engine 1 is in a cold state, as described above, the butterfly valve 42 is temporarily closed to activate the three-way catalyst 30 early. Thus, the exhaust pressure in the exhaust pipe 20 rises so that reaction of an unburned fuel in an exhaust system including the combustion chamber and the exhaust pipe 20 is accelerated to increase the exhaust gas temperature, whereupon the three-way catalyst 30 is activated early.

Since the butterfly valve 42 is in a high-temperature, high-pressure environment, it sometimes may go wrong and cease to serve satisfactorily as an on-off valve after prolonged use. If the butterfly valve 42 thus goes wrong so that is function as the exhaust flow control device 40 is damages, the harmful substances may not be satisfactorily purified when the engine 1 is cold unless the on-off valve 42 is fully closed. If the on-off valve 42 fails to be fully opened, on the other hand, trouble may possibly occur such that the exhaust efficiency lowers to depress the output of the internal-combustion engine.

According to the fault diagnosis on the exhaust flow control valve of the present invention, therefore, the exhaust pressure is estimated in accordance with the output of the exhaust sensor 22 in consideration of the fact that the exhaust sensor 22 detects the concentration by utilizing the partial pressure of the specific component in the exhaust gas, whereby the failure of the butterfly valve 42 or malfunction of the exhaust flow control device 40 is diagnosed (performance lowering identifying means).

The exhaust sensor 22 that utilizes the partial pressure of the specific component may be any of various sensors such as an $O_2$ sensor, A/F sensor (linear A/F sensor, LAFS), NOx sensor, etc. The following is a description of embodiments for cases where the $O_2$ sensor and the A/F sensor are used, individually.

A first embodiment will be described first.

In the case of this first embodiment, the $O_2$ sensor is used as the exhaust sensor 22. The aforementioned Nernst formula is applied to the case where the $O_2$ sensor is used.

Referring to FIG. 3, there is shown a flowchart that illustrates a fault diagnosis routine for the case where the $O_2$ sensor according to the first embodiment is used, which is executed by the ECU 60. This routine will now be described with reference to this flowchart.

In Step S10, whether or not the exhaust A/F is a rich air-fuel ratio (including stoichiometric), that is, whether or not the exhaust gas is in a rich atmosphere, is determined in accordance with information from the $O_2$ sensor. Whether or not the atmosphere is a rich atmosphere is thus determined for the following reason. If the exhaust A/F is a rich air-fuel ratio, the $H_2$ partial pressure increases so that the $O_2$ sensor output is enhanced as the exhaust pressure rises. The extent of this change is more definite than that of the change of the $O_2$ partial pressure with a lean air-fuel ratio, and is suited for the fault diagnosis.

If the decision in Step S10 is negative (No), that is, if the atmosphere is concluded to be a lean atmosphere, this routine is finished at once. If the decision in Step S10 is positive (Yes), on the other hand, the program advances to Step S12.

In Step S12, whether or not the butterfly valve 42 is in a closed state (fully-closed state in this case) is determined. If the decision is positive (Yes), that is, if the valve is concluded to be fully closed, the program then advances to Step S14.

If the butterfly valve 42 is in the closed states, the exhaust pressure can be concluded to have reached a predetermined or given high pressure (e.g., 800 mmHg–1,067 hPa). An $O_2$ sensor output $A_0$ corresponding to this given pressure is learned from an experiment and the like. In Step S14, therefore, whether or not the $O_2$ sensor output is approximate to the aforesaid $O_2$ sensor $A_0$ is determined. In this case, whether or not the detected $O_2$ sensor output is smaller than a given value $A_2$ ($A_0 \leq A_2$) is determined.

If the decision in Step 514 is positive (Yes), that is, if the $O_2$ sensor output is smaller than the given value $A_2$, an abnormal situation can be supposed such that the $H_2$ partial pressure is low and the exhaust pressure is not high enough despite the closed state of the butterfly valve 42. More specifically, the butterfly valve 42 can be supposed to be in some trouble. In this case, therefore, the program then advances to Step S16, whereupon it is concluded that the butterfly valve 42 has trouble, and the warning lamp 50 is lit to inform a driver of something abnormal.

If the decision in Step S14 is negative (No), that is, if the $O_2$ sensor output is output $A_0$ is not smaller than the given value $A_2$, on the other hand, it can be concluded that the exhaust pressure is high enough for the normal operation of the butterfly valve 42. In this case, therefore, the program advances to Step S18, whereupon no fault diagnosis is made or the fault diagnosis is canceled, and the warning lamp 50 is kept off without being lit.

If the decision in Step S12 is negative (No), that is, if the butterfly valve 42 is in an open state (fully-open state in this case), the program then advances to Step S19.

If the butterfly valve 42 is in the open state, the exhaust pressure must take a value approximate to the atmospheric pressure. In this case, the $O_2$ sensor output $A_0$ takes a value for normal use. In Step S19, therefore, whether or not the $O_2$ sensor output $A_0$ is greater than a given value $A_3$ ($A_3 \leq A_0$) is determined.

If the decision in Step S19 is positive (Yes), that is, if the $O_2$ sensor output $A_0$ is greater than the given value $A_3$, an abnormal situation can be supposed such that the $H_2$ partial pressure is high and the exhaust pressure is extremely high despite the open state of the butterfly valve 42. More specifically, the butterfly valve 42 can be supposed to have some trouble. In this case, therefore, the program advances to Step S16, whereupon it is concluded that the butterfly valve 42 has trouble, and the warning lamp 50 is lit to inform the driver of something abnormal, as in the aforesaid case.

If the decision in Step S19 is negative (No), that is, if the $O_2$ sensor output $A_0$ is not greater than the given value $A_3$, it can be concluded that the exhaust pressure is low enough for the normal operation of the butterfly valve 42. In this case, therefore, the program advances to Step S18, whereupon no fault diagnosis is made or the fault diagnosis is canceled, and the warning lamp 50 is kept off without being lit, as in the aforesaid case.

The following is a description of a second embodiment.

In this second embodiment, as in the first embodiment described above, the $O_2$ sensor is used as the exhaust sensor 22, and the Nernst formula is also applied.

Figure 4:
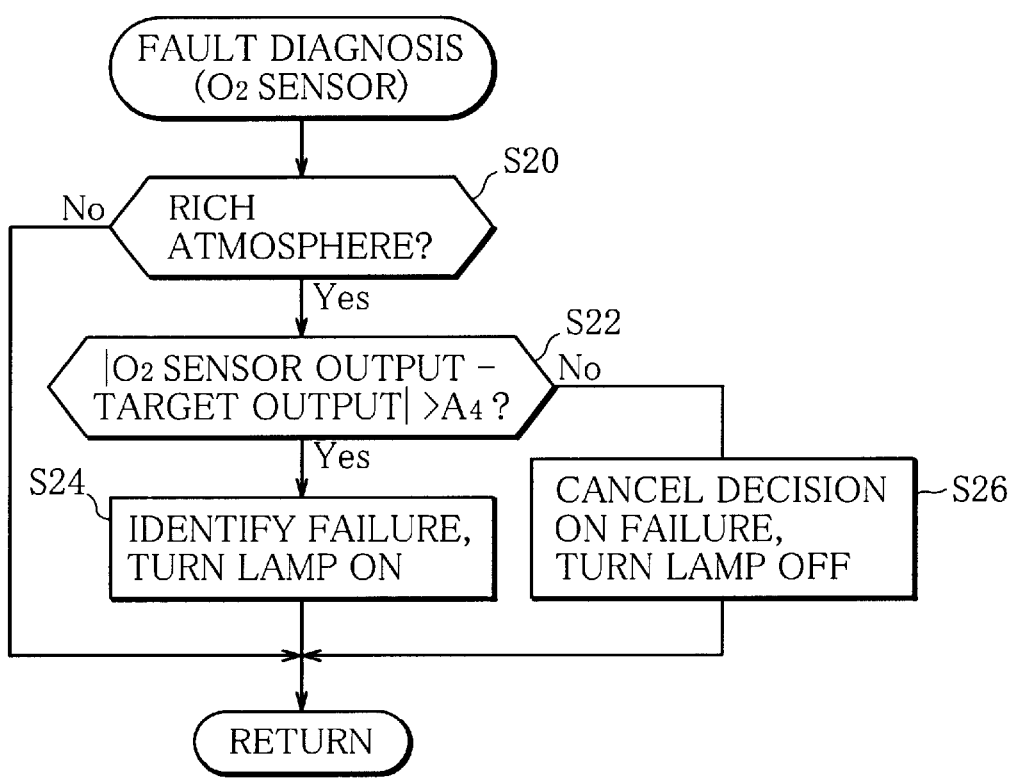
FIG. 4 is a flowchart showing a fault diagnosis routine according to a second embodiment.

Referring to FIG. 4, there is shown a flowchart that illustrates a fault diagnosis routine according to the second embodiment that is executed by the ECU 60. This routine will now be described with reference to this flowchart. However, only the difference from the first embodiment will be described below.

In Step S20, as in Step S10 mentioned before, whether or not the atmosphere is a rich atmosphere is determined. If the decision is positive (Yes), the program then advances to Step S22.

In Step S22, whether or not the absolute value of the difference between the $O_2$ sensor output and a target output of the $O_2$ sensor set in accordance with the opening of the butterfly valve 42 is greater than a given value $A_4$ ($|O_2$ sensor output−target output$|>A_4$) is determined in the presence of the same rich atmosphere (same exhaust component concentration). Thus, in this case unlike the case of the first embodiment, a deviation in the exhaust pressure is monitored by detecting the difference between the actual $O_2$ sensor output and the preset target output without regard to the state, closed or open, of the butterfly valve 42. By doing this, a situation involving an extraordinary exhaust pressure can be securely detected to ensure an accurate decision on the failure of the butterfly valve 42 even in the case where the butterfly valve 42 is adjusted to an intermediate opening other than openings for the fully-closed and fully-open states.

If the decision in Step S22 is positive (Yes), that is, if the absolute value of the difference between the $O_2$ sensor output and the target output is greater than the given value $A_4$, therefore, an abnormal situation can be supposed such that the exhaust pressure is too high or too low for the opening of the butterfly valve 42. In this case, the program then advances to Step S24, whereupon it is concluded that the butterfly valve 42 has trouble, and the warning lamp 50 is lit, as in the case of Step S16.

If the decision in Step S22 is negative (No), that is, if the absolute value of the difference between the $O_2$ sensor output and the target output is not greater than the given value $A_4$, on the other hand, it can be concluded that the exhaust pressure is approximate to the target exhaust pressure and that the butterfly valve 42 is operating normally. In this case, the program then advances to Step S26, whereupon no fault diagnosis is made or the fault diagnosis is cancelled, and the warning lamp 50 is kept off without being lit, as in the case of Step S18.

The following is a description of a third embodiment.

In the case of this third embodiment, the A/F sensor is used as the exhaust sensor 22. The aforementioned pump-current formulas are applied to the case where the A/F sensor is used.

Figure 5:
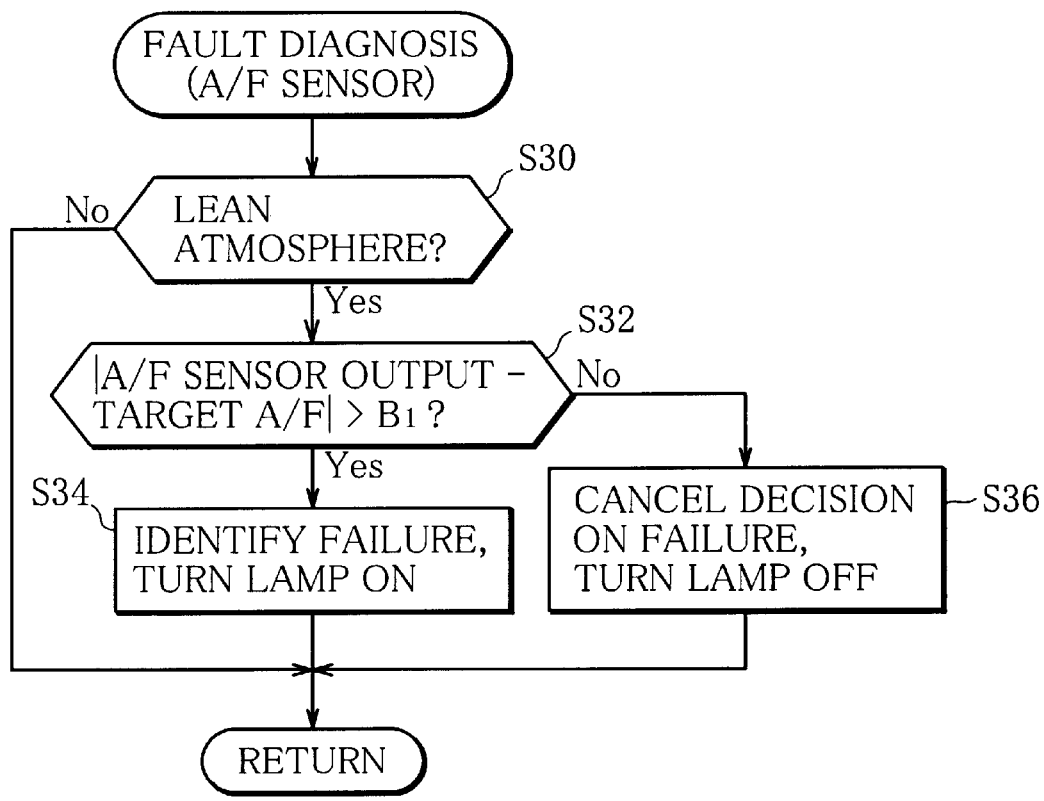
FIG. 5 is a flowchart showing a fault diagnosis routine for the case where an A/F sensor according to a third embodiment is used.

Referring to FIG. 5, there is shown a flowchart that illustrates a fault diagnosis routine for the case where the A/F sensor is used, which is executed by the ECU 60. This routine will now be described with reference to this flowchart.

Figure 6:
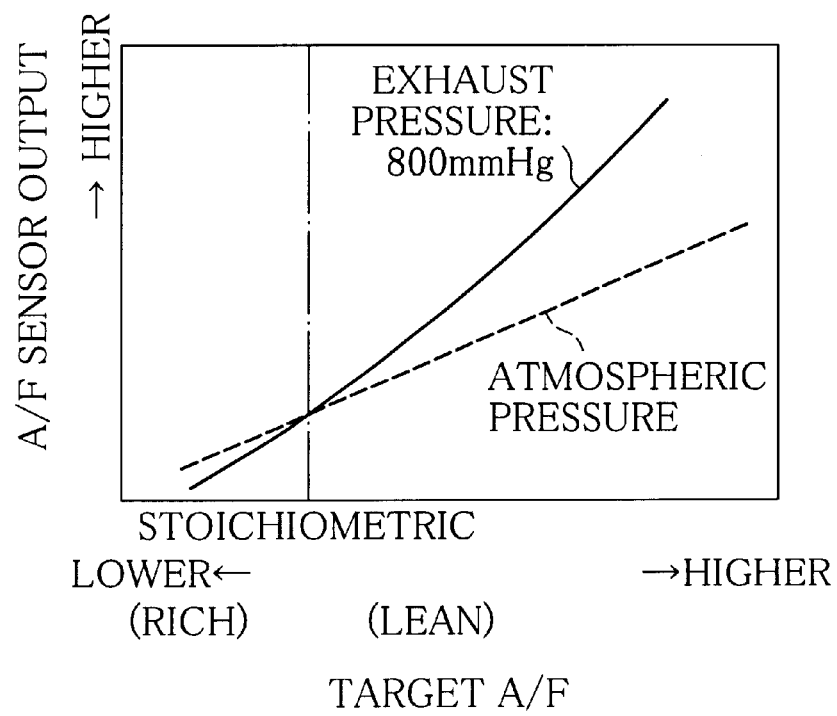
FIG. 6 is a diagram showing relations between a target A/F and A/F sensor output for cases where the exhaust pressure is adjusted to the atmospheric pressure (broken line) and a given high pressure (full line; e.g., 800 mmHg= 1,067 hPa)

In Step S30, whether or not the exhaust A/F is a lean air-fuel ratio, that is, whether or not the exhaust gas is in a lean atmosphere, is determined in accordance with information from the A/F sensor. Whether or not the atmosphere is a lean atmosphere for the case of the A/F sensor is thus determined for the following reason. If the exhaust A/F is a lean air-fuel ratio, the extent of change of the A/F sensor output that corresponds to the change of the exhaust pressure is definite enough to suit the fault diagnosis. Referring to FIG. 6, there are shown relations between a target A/F (target air-fuel ratio) and the A/F sensor output for cases where the exhaust pressure is adjusted to the atmospheric pressure (broken line) and the given high pressure (full line; e.g., 800 mmHg=1,067 hPa). If the air-fuel ratio A/F is within the range of lean air-fuel ratios, the output value of the A/F sensor changes considerably when the exhaust pressure rises to a high pressure.

If the decision in Step S30 is negative (No), that is, if the atmosphere is concluded to be a rich atmosphere, this routine is finished at once. If the decision in Step S30 is positive (Yes), on the other hand, the program advances to Step S32.

In Step S32, whether or not the absolute value of the difference between the A/F sensor output and a target A/F (target output) of the A/F sensor set in accordance with the opening of the butterfly valve 42 is greater than a given value $B_1$ ($|$A/F sensor output−target A/F$|$) is determined in the presence of the same lean atmosphere (same exhaust component concentration) Thus, in this case like the case of the second embodiment, a deviation in the exhaust pressure is monitored by detecting the difference between the actual A/F sensor output and the preset target A/F without regard to the state, closed or open, of the butterfly valve 42.

By doing this, a situation involving an extraordinary exhaust pressure can be securely detected by means of the A/F sensor to ensure a continually satisfactory decision on the failure of the butterfly valve 42 even in the case where the butterfly valve 42 is adjusted to an intermediate opening other than openings for the fully-closed and fully-open states.

If the decision in Step S32 is positive (Yes), that is, if the absolute value of the difference between the A/F sensor output and the target A/F is greater than the given value $B_1$, therefore, an abnormal situation can be supposed such that the exhaust pressure is too high or too low for the opening of the butterfly valve 42. In this case, the program then advances to Step S34, whereupon it is concluded that the butterfly valve 42 has trouble, and the warning lamp 50 is lit, as in the aforesaid case.

If the decision in Step S32 is a negative (No), that is, if the absolute value of the difference between the A/F sensor output and the target A/F is not greater than the given value $B_1$, on the other hand, it can be concluded that the exhaust pressure is approximate to the target exhaust pressure and that the butterfly valve 42 is operating normally. In this case, the program then advances to Step S26, whereupon no fault diagnosis is made or the fault diagnosis is canceled, and the warning lamp 50 is kept off without being lit, as in the aforesaid case.

The following is a description of a fourth embodiment.

In this fourth embodiment, as in the third embodiment described above, the A/F sensor is used as the exhaust sensor 22, and the pump-current formulas are also applied.

Figure 7:
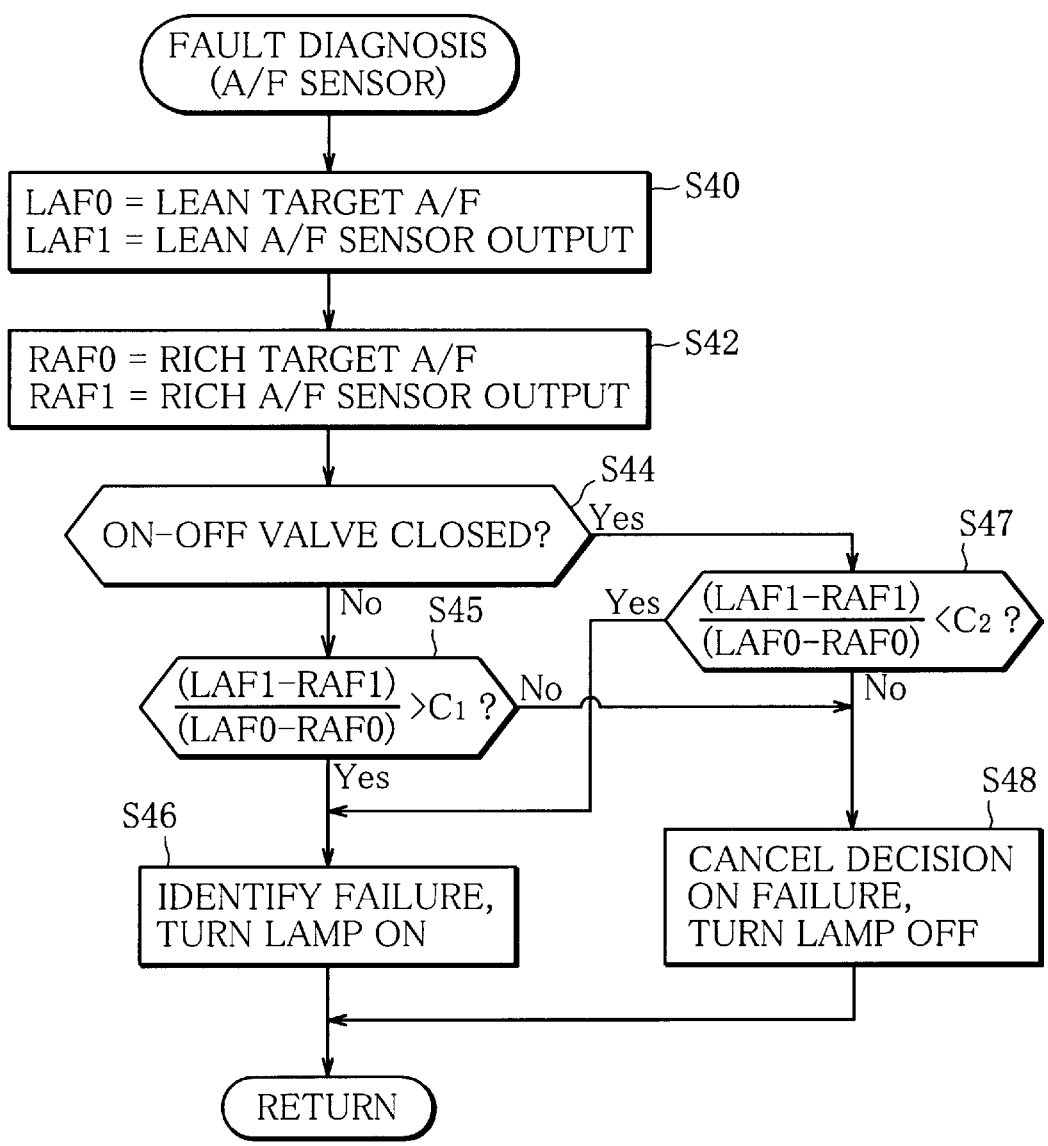
FIG. 7 is a flowchart showing a fault diagnosis routine according to a fourth embodiment.

Referring to FIG. 7, there is shown a flowchart that illustrates a fault diagnosis routine according to the fourth embodiment that is executed by the ECU 60. This routine will now be described with reference to this flowchart. The fourth embodiment, unlike the third embodiment, uses both the A/F sensor output for the case where the air-fuel ratio A/F is a lean air-fuel ratio and the A/F sensor output for the case where the air-fuel ratio is a rich air-fuel ratio (including stoichiometric).

If the butterfly valve 42 is adjusted to a given opening, the target A/F of the A/F sensor for the case where the air-fuel ratio A/F is a given lean air-fuel ratio is read as LAF0, and the A/F sensor output (concentration of one specific exhaust component) based on the $O_2$ partial pressure near the same air-fuel ratio is detected as LAF1, in Step S40 first. Thus, the ECU 60 is stored with the target A/F, LAF0, of the A/F sensor for the case where the air-fuel ratio A/F is the given lean air-fuel ratio and the A/F sensor output LAF1.

In Step S42, moreover, the target A/F of the A/F sensor for the case where the butterfly valve 42 is adjusted to the aforesaid given opening and the air-fuel ratio A/F is a given rich air-fuel ratio (or stoichiometric) is read as RAF0, and the A/F sensor output (concentration of another specific exhaust component) based on the $H_2$ partial pressure approximate to the same air-fuel ratio is detected as RAF1. Thus, the ECU 60 is stored with the target A/F, RAF0, of the A/F sensor for the case where the air-fuel ratio A/F is the given rich air-fuel ratio and the A/F sensor output RAF1.

When the target A/F's, LAF0 and RAF0, of the A/F sensor and the A/F sensor outputs LAF1 and RAF1 are obtained in this manner, whether or not the butterfly valve 42 is in the closed state (fully-closed state in this case) is determined in the next step or Step S44. If the decision is negative (No), that is, if the butterfly valve 42 is in the open state, whether or not the following expression (5) holds is then determined in Step S45:

$$(LAF1-RAF1)/(LAF0-RAF0) > C_1. \qquad (5)$$

Thus, whether or not the ratio of the difference (LAF1−RAF1) between the A/F sensor outputs for the lean air-fuel ratio and the rich air-fuel ratio to the difference (LAF0−RAF0) between the target A/F's is greater than a given value $C_1$ is determined. More specifically, the inclination of the A/F sensor output is obtained, and whether or not this value is greater than the given value $C_1$ is determined. This is done because the A/F sensor output is kept at the target A/F approximate to the stoichiometric even if the exhaust pressure is raised or lowered and the output gradient of the A/F sensor changes around a value approximate to the stoichiometric so that the aforesaid value changes if the exhaust pressure is raised or lowered, as shown in FIG. 6.

If the difference (LAF1−RAF1) between the A/F sensor outputs and the difference (LAF0−RAF0) between the target A/F's and the ratio between the differences are obtained in this manner, a noise involved in the A/F sensor outputs, that is, an output error attributable to any other factor than the exhaust pressure, can be removed.

More are specifically, the A/F sensor outputs LAF1 and RAF1 are given as "(target A/F)+(output errors attributable to any other factors than exhaust pressure+output errors attributable to exhaust pressure)" or "target A/F)×(output errors attributable to any other factors than exhaust pressure×output errors attributable to exhaust pressure)." Thus, the output errors attributable to any factors other than the exhaust pressure are added to or multiplied by the target A/F. However, the output errors attributable to any factors other than the exhaust pressure always act in the same direction, while the output errors attributable to the exhaust pressure act in opposite directions on the lean and rich sides, as mentioned before. Accordingly, the errors attributable to the addition based on any factors other than the exhaust pressure can be canceled by obtaining the difference (LAF1−PAF1) between the A/F sensor outputs and the difference (LAF0−PAF0) between the target A/F's.

Further, the errors attributable to the multiplication based on any factors other than the exhaust pressure can be canceled by obtaining the ratio (LAF1/PAF1) between the A/F sensor outputs, the ratio (LAF0/RAF0) between the target A/F's, and the ratio between these ratios and making a decision.

By doing this, all the output errors attributable to any factors other than the exhaust pressure can be eliminated so that a deviation in the exhaust pressure can be monitored in consideration of the output errors attributable to the exhaust pressure only. Thus, the failure of the butterfly valve 42 can be identified with high accuracy.

If the decision in Step S45 is positive (Yes), that is, if the aforesaid expression (5) holds, therefore, the output gradient of the A/F sensor is great, and an abnormal situation can be suppressed such that the exhaust pressure is too high for the opening of the butterfly valve 42. In this case, the program then advances to Step S46, whereupon it is concluded that the butterfly valve 42 has trouble, and the warning lamp 50 is lit, as in the aforesaid case.

If the decision in Step S45 is negative (No), that is, if the aforesaid expression (5) never holds, on the other hand, it can be concluded that the exhaust pressure is approximate to the target exhaust pressure and that the butterfly valve 42 is operating normally. In this case, the program then advances to Step S48, whereupon no fault diagnosis is made or the fault diagnosis is canceled, and the warning lamp 50 is kept off without being lit, as in the aforesaid case.

If the decision in Step S44 is positive (Yes), that is, if the butterfly valve 42 is in the closed state, whether or not the following expression (6) holds is then determined in Step S47:

$$(LAF1-RAF1)/(LAF0-PAF0) < C_2. \quad (6)$$

If the decision is positive (Yes), that is, if the aforesaid expression (6) holds, an abnormal situation can be supposed such that the exhaust pressure is too low for the opening of the butterfly valve 42. In this case, the program then advances to Step S46, whereupon it is concluded that the butterfly valve 42 has trouble, and the warning lamp 50 is lit, as in the aforesaid case.

If the decision in Step S47 is negative (No), that is, if the aforesaid expression (6) never holds, on the other hand, the program then advances to Step S48, whereupon no fault diagnosis is made or the fault diagnosis is canceled, and the warning lamp 50 is kept off without being lit, as in the aforesaid case.

The following is a description of a fifth embodiment.

In this fifth embodiment, as in the third and fourth embodiments described above, the A/F sensor is used as the exhaust sensor 22, and the pump-current formulas are also applied.

Figure 8:
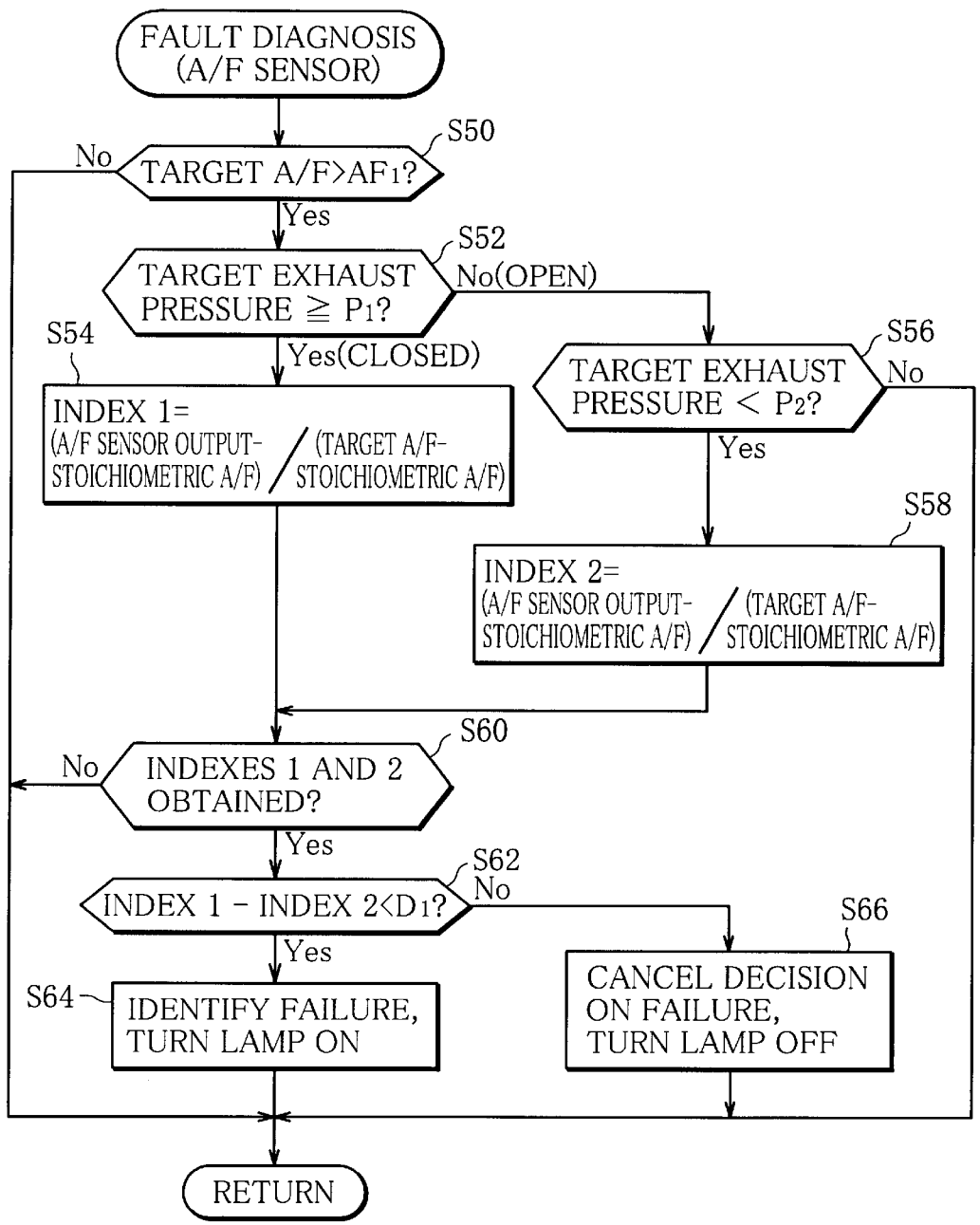
FIG. 8 is a flowchart showing a fault diagnosis routine according to a fifth embodiment.

Referring to FIG. 8, there is shown a flowchart that illustrates a fault diagnosis routine according to the fifth embodiment that is executed by the ECU 60. This routine will now be described with reference to this flowchart.

In the fifth embodiment, the fault diagnosis is made in accordance with the A/F sensor output for the case where the butterfly valve 42 is in the open state and the A/F sensor output for the case where the butterfly valve 42 is in the closed state.

In Step S50, whether or not the target A/F is greater than a given value $AF_1$ (e.g., 20) is determined. This decision is made for the same reason for which whether or not the exhaust gas is in a lean atmosphere is determined in Step S30 of the third embodiment.

If the decision in Step S50 is negative (No), this routine is finished at once. If the decision is positive (Yes), on the other hand, the program then advances to Step S52.

If the decision in Step S52 is negative (No), that is, if the target exhaust pressure is lower than the given value $P_1$, on the other hand, the program then advances to Step S56, whereupon whether or not the target exhaust pressure is lower than a given value $P_2$ (e.g., 100 mmHg–133 hPa) is determined. In other words, whether or not the butterfly valve 42 is in the open state is determined in the same manner as aforesaid. If the butterfly valve 42 is in the open state, the target exhaust pressure is equal to the atmospheric pressure. However, the fault diagnosis can be made if the target exhaust pressure is thus lowered to a certain extent. If the decision is negative (No), this routine if finished at once. If the decision is positive (Yes), the program then advances to Step S58.

In Step S58, an index 2 for the open state is obtained from the following expression (8):

$$\text{Index } 2 = (\text{A/F sensor output} - \text{stoichiometric A/F})/(\text{target A/F} - \text{stoichiometric A/F}). \quad (8)$$

In this case, the indexes 1 and 2 are set in a manner such that the inclination of the A/F sensor output is obtained as (A/F sensor output−stoichiometric A/F)/(target A/F−stoichiometric A/F) with a stoichiometric that is influenced little by the exhaust pressure as the point of origin. Alternatively, however, the indexes 1 and 2 may be set as (A/F sensor output target A/F) or (A/F sensor output/target A/F).

Preferably, moreover, the indexes 1 and 2 used should be indexes that are obtained immediately before and after the target exhaust pressure is switched over to the given values $P_1$ and $P_2$. Thus the indexes 1 and 2 serve as indexes under the same operating conditions, so that the accuracy of the fault diagnosis is improved.

Although an average of the indexes 1 and 2 may be obtained, a momentary value may be used alternatively.

Although the stoichiometric A/F should preferably be changed depending on the fuel used, moreover, it may alternatively be a fixed value.

In Step S60, whether or not the indexes 1 and 2 are obtained is determined. If the indexes 1 and 2 are obtained in the aforesaid manner, the program then advances to Step S62.

In Step S62, whether or not the difference between the indexes 1 and 2 is smaller than a given value $D_1$ (e.g., 0.4) is determined (index 1−index 2<$D_1$).

Thus, in the fifth embodiment, the fault diagnosis is made in consideration of the A/F sensor output obtained before or after the actuation of the butterfly valve 42. Although the given value D1 may be a fixed value, it may be changed depending on the target exhaust pressure.

Although whether or not the difference between the indexes 1 and 2 is smaller than the given value $D_1$ is determined in this case, whether or not the ratio between the indexes 1 and 2 is lower than a given value $D_2$ (index 1/index 2<$D_2$?) may be determined.

If the decision in Step S62 is positive (Yes), that is, if the difference between the indexes 1 and 2 is smaller than the given value $D_1$, this can be concluded to be an abnormal situation. In this case, the program then advances to Step S64, whereupon it is concluded that there is a failure, and the warning lamp 50 is lit, as in the aforesaid case.

If the decision in Step S62 is negative (No), that is, if the difference between the indexes 1 and 2 is not smaller than the given value $D_1$, it can be concluded that there is no problem. In this case, the program then advances to Step S66, whereupon no fault diagnosis is made or the fault diagnosis is canceled, and the warning lamp 50 is kept off without being lit, as in the aforesaid case.

Although the given values $P_1$ and $P_2$, threshold decision values, are different values in the decisions of Steps S52 and S56, the given values $P_1$ and $P_2$ may alternatively be the same value.

Although the fifth embodiment may be carried out singly, moreover, it may be used in combination with the third and fourth embodiments described before.

Although the butterfly valve 42 is used as the exhaust flow control device 40 in each of the foregoing embodiments, moreover, the exhaust flow control device 40 may be a device of any configuration provided that it can variably control the exhaust pressure.

Although the A/F sensor is used in the third to fifth embodiments, furthermore, an NOx sensor may be used in place of the A/F sensor. Since the NOx sensor has the same principle of operation, it can produce the same effect of the A/F sensor.

"Regeneration of Post-Exhaust Processor"

Figure 9:
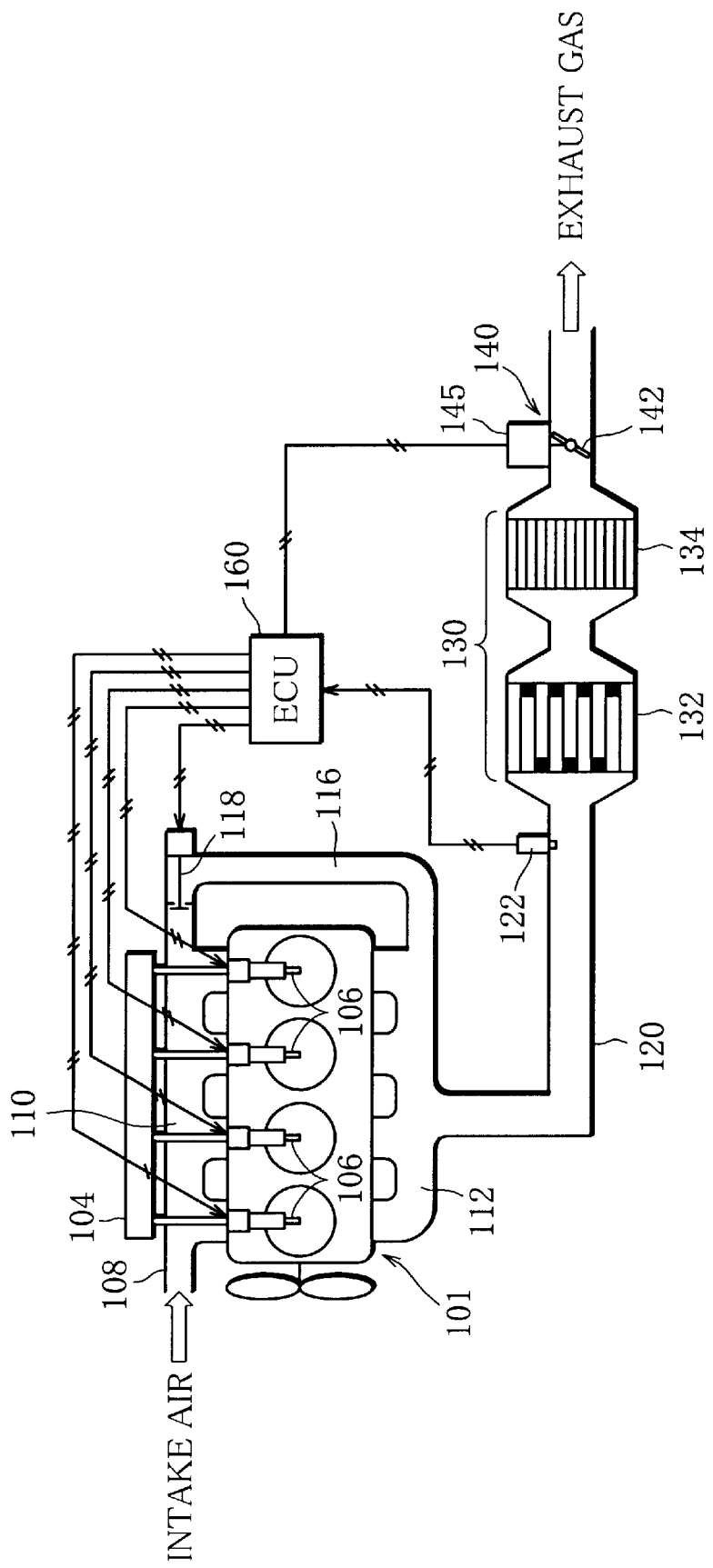
FIG. 9 is a schematic view of an exhaust emission control device of an internal-combustion engine related to regeneration of a post-exhaust processor of the present invention.

Referring to FIG. 9, there is shown a schematic view of an exhaust emission control device of an internal-combustion engine related to regeneration of a post-exhaust processor of the present invention. The following is a description of this exhaust emission control device.

In this case, a straight four-cylinder diesel engine is used as an engine 101, an internal-combustion engine.

A fuel supply system of the engine 101 is formed of a common rail system, for example. In this system, each cylinder is provided with an injector (fuel injection nozzle) 106. The injectors 106 are connected to a common rail 104. Further, each injector 106 is connected to an electronic control unit (ECU) 160. It can open and close a valve in response to a fuel injection command from the ECU 160 and inject a fuel in the common rail 104 into each combustion chamber at high pressure with desired timing. More specifically, the injectors 106 can freely carry out post-injection (sub-injection) of an additional fuel during the expansion or exhaust stroke, as well as main injection of a main fuel. Since the common rail system is a conventional one, a detailed description of the configuration of this common rail system is omitted herein.

An intake pipe 108 is connected to the intake port of the engine 101 by means of an intake manifold 110. On the other hand, an exhaust pipe 120 is connected to the exhaust port by means of an exhaust manifold 112.

An EGR passage 116 extends from the exhaust manifold 112, and the terminal end of the EGR passage 116 is connected to the intake manifold 110. The EGR passage 116 is fitted with a solenoid-operated EGR valve 118.

As shown in the same drawing, the exhaust pipe 120 is fitted with a post-exhaust processor 130. The post-exhaust processor 130 is an exhaust emission control device that is composed of a catalyst converter and a diesel particulate filter (DPF, exhaust emission control means) for purifying harmful substances (NC, CC, NOx, etc.) and PM (particulate matter) in exhaust gas. In this case, the post-exhaust processor 130 is formed having an occlusion-type NOx catalyst 134 on the down-stream side of a DPF 132.

The occlusion-type NOx catalyst 134 is a catalyst that occludes NOx if the exhaust A/F is a lean air-fuel ratio and discharges and reduces the occluded NOx if the exhaust A/F is changed into a rich air-fuel ratio (or theoretical air-fuel ratio).

Further, the exhaust pipe 120 is provided with an exhaust flow control device 140 that has the same function with the exhaust flow control device 40. A butterfly valve 142 similar to the butterfly valve 42 is used as the exhaust flow control device 140. The exhaust flow control device 140 serves also as an exhaust brake in a valve-closed state.

An exhaust sensor 122 for detecting $O_2$ and $H_2$ concentrations as specific component concentrations in the exhaust pipe 120 is provided on the upper-stream side of the DPF 132 on the exhaust pipe 120.

The ECU 160, like the ECU 60, is a control device that carries out comprehensive control of the exhaust emission control device of the internal-combustion engine according to the present invention including the engine 101.

The input side of the ECU 160 is connected with various sensors attached to the engine 101, the exhaust sensor 122, etc.

On the other hand, the output side of the ECU 160 is connected with the fuel injection valve 106, the EGR valve 118, an actuator 145 of the exhaust flow control device 140, etc., as well as various devices.

The following is a description of the operation of the exhaust emission control device of the internal-combustion engine related to the regeneration of the post-exhaust processor of the present invention constructed in this manner.

According to regeneration of the post-exhaust processor of the present invention, as described above, the exhaust pressure is estimated in accordance with the output of the exhaust sensor 122 in consideration of the fact that the exhaust sensor 122 detects the concentration by utilizing the partial pressures of the $O_2$ and $H_2$ components in the exhaust gas, whereby clogging of the DPF 132 with the PM is identified (performance lowering identifying means).

The exhaust sensor 122 that utilizes the partial pressures of the $O_2$ and $H_2$ components may be any of various sensors such as an $O_2$ sensor, A/F sensor (linear A/F sensor, LAFS), NOx sensor, etc. The following is a description of embodiments for cases where the $O_2$ sensor and the A/F sensor are used, individually.

A sixth embodiment will be described first.

In the case of this sixth embodiment, the A/F sensor is used as the exhaust sensor 122. The aforementioned pump-current formulas are applied to the case where the A/F sensor is used.

Figure 10:
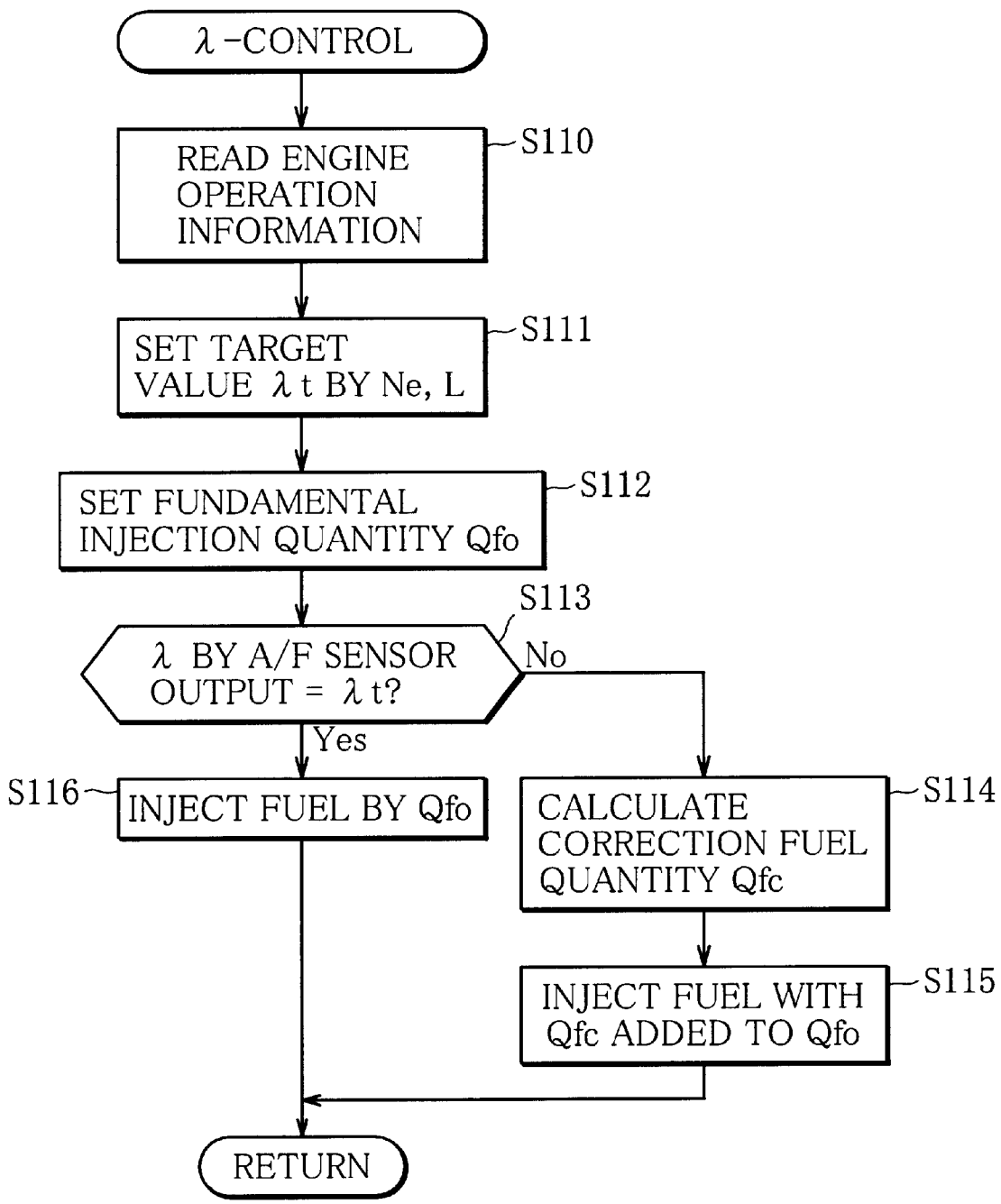
FIG. 10 is a flowchart showing a control routine for injection quantity feedback control ($\lambda$-control) based on an excess air factor $\lambda$.

Referring to FIG. 10, there is shown a flowchart that illustrates a control routine for feedback control ($\lambda$-control) of the injection quantity based on an excess air factor $\lambda$ of the engine 101, which is executed by the ECU 160. The $\lambda$-control will be described first.

In Step S110, operation information on the engine 101 is read. More specifically, an engine speed Ne and engine loads (accelerator opening, rack position for the case of a pre-stroke fuel injection pump, etc.) L are read.

In Step S111, a target value of the excess air factor $\lambda$, that is, a target excess air factor $\lambda t$, is set in accordance with the engine speed Ne and the engine loads L.

In Step S112, a fundamental injection quantity $Qf_0$ is set in accordance with the engine speed Ne, the engine loads L, or the target excess air factor $\lambda t$ and a new charge flow rate Qa.

In Step S113, whether or not the excess air factor $\lambda$ detected from the A/F sensor output and the target value $\lambda t$ are equal is determined. If the decision is negative (No), a correction fuel quantity Qfc corresponding to the deviation between the excess air factor $\lambda$ detected from the A/F sensor output and the target value $\lambda t$ is calculated in Step S114, and fuel injection is carried out with the correction fuel quantity Qfc added to the fundamental injection quantity $Qf_0$ in Step S115. If the decision is positive (Yes), on the other hand, fuel injection is carried out in accordance with the fundamental injection quantity $Qf_0$ in Step S116.

In carrying out the $\lambda$-control in a diesel engine, in general, the target excess air factor $\lambda t$ is high, and the exhaust A/F is a lean air-fuel ratio.

Figure 11:
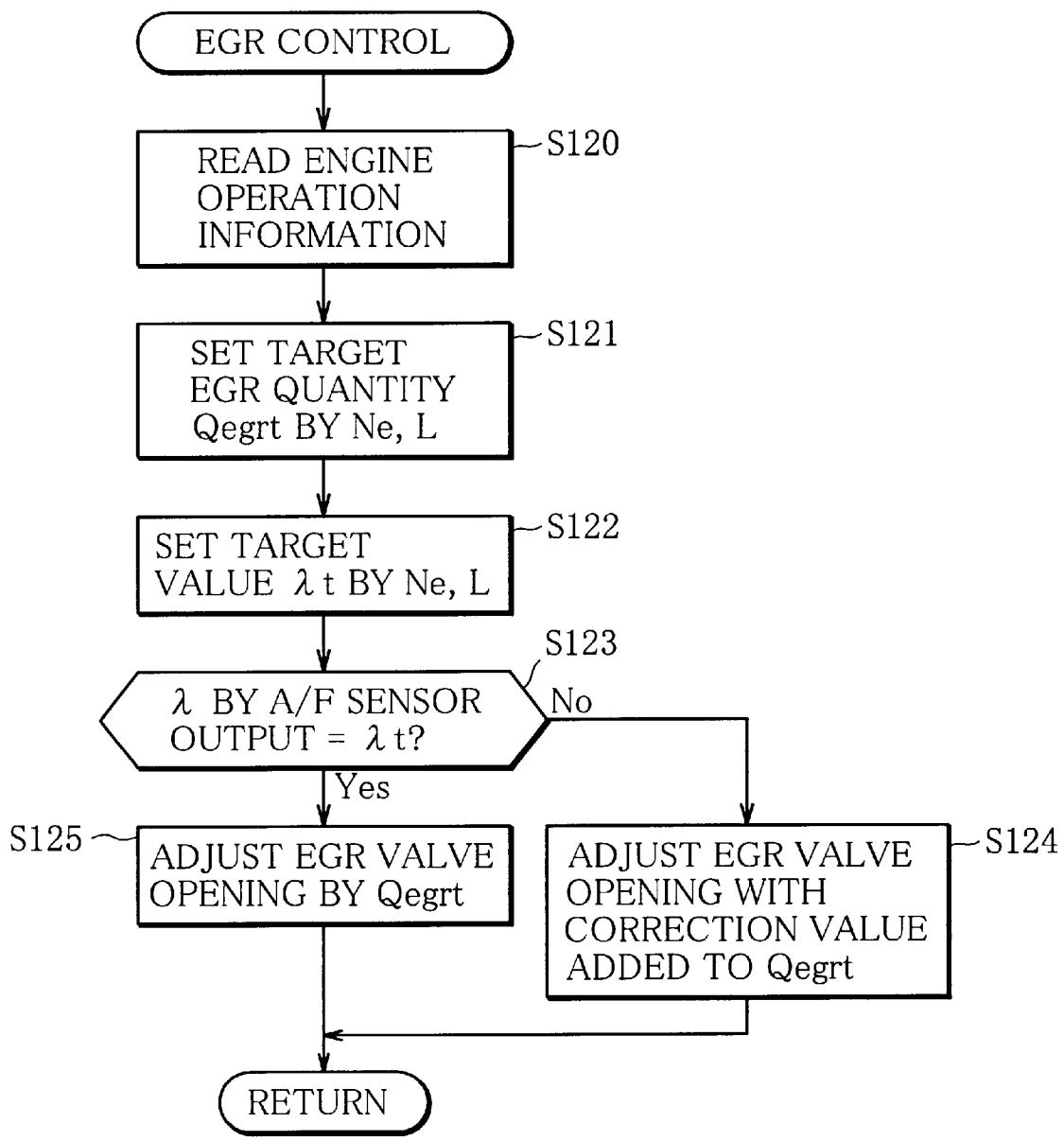
FIG. 11 is a flowchart showing a control routine for EGR control.

Referring to FIG. 11, moreover, there is shown a flowchart that illustrates a control routine for exhaust reflux feedback control or EGR control, which is executed by the ECU 160. The following is a description of the EGR control.

In Step S120, the operation information on the engine 101, that is, the engine speed Ne and the engine loads (accelerator opening, rack position for the case of a pre-stroke fuel injection pump, etc.) L, is read, as in the aforesaid case.

In Step S121, a target value of an EGR quantity Qegr, that is, a target EGR quantity Qegrt, is set in accordance with the engine speed Ne and the engine loads L.

In Step S122, the target value of the excess air factor $\lambda$, that is, the target excess air factor $\lambda t$, is also set in accordance with the engine speed Ne and the engine loads L.

In Step S123, whether or not the excess air factor $\lambda$ detected from the A/F sensor output and the target value $\lambda t$ are equal is determined. If the decision is negative (No), a correction value corresponding to the deviation between the excess air factor $\lambda$ detected from the A/F sensor output and the target value $\lambda t$ is added to the target EGR quantity Qegrt, and the opening of the EGR valve 118 is adjusted. If the decision is positive (Yes), on the other hand, the opening of the EGR valve 118 is adjusted in accordance with the target EGR quantity Qegrt in Step S125.

In the case where the EGR control is carried out in this manner, the exhaust A/F is a lean air-fuel ratio as long as the target excess air factor $\lambda t$ has a large value.

Figure 12:
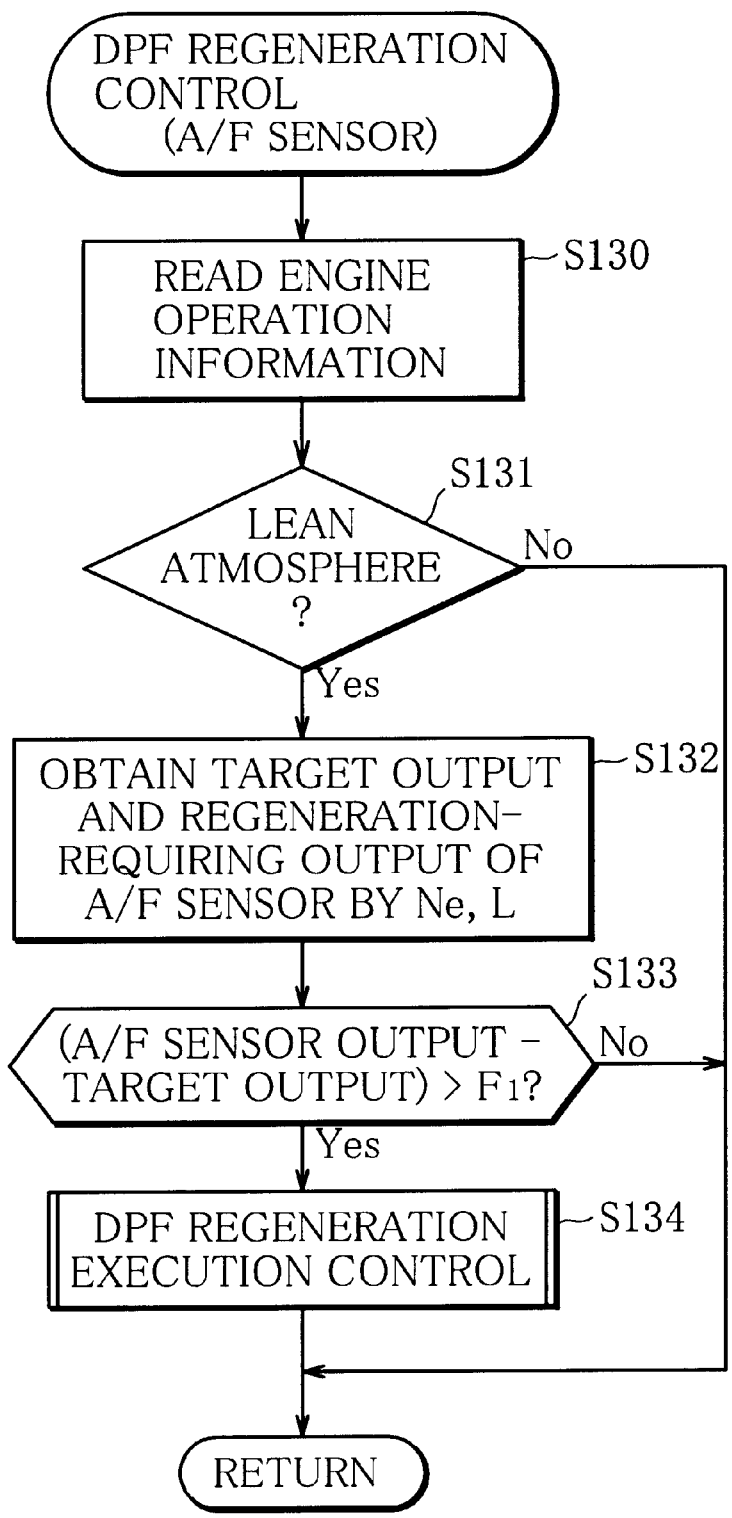
FIG. 12 is a flowchart showing a DPF regeneration control routine according to a sixth embodiment.

Referring to FIG. 12, there is shown a flowchart that illustrates a DPF regeneration control routine for the case where the A/F sensor is used. The following is a description of the DPF regeneration control.

In Step S130, the operation information on the engine 101, that is, the engine speed Ne and the engine loads (accelerator opening, rack position for the case of a pre-stroke fuel injection pump, etc.) L, is read.

In Step S131, whether or not the exhaust A/F is a lean air-fuel ratio, that is, whether or not the exhaust gas is in a lean atmosphere, is determined in accordance with information from the A/F sensor. Whether or not the atmosphere is a lean atmosphere for the case where the A/F sensor is used is thus determined for the following reason. In the case where the λ-control or the EGR control is carried out in a diesel engine, in general, the air-fuel ratio is a lean air-fuel ratio. In the case where the lean air-fuel ratio is used, the higher the degree of leanness, the higher the extent of change of the A/F sensor output that corresponds to the change of the exhaust pressure is. This suits the determination on the necessity of DPF regeneration. It is to be understood that the necessity of DPF regeneration in a rich atmosphere may be determined.

If the decision in Step S131 is negative (No), that is, if the atmosphere is concluded to be a rich atmosphere, this routine is finished at once. If the decision in Step S131 is positive (Yes), on the other hand, the program advances to Step S132.

In Step S132, a target output of the A/F sensor corresponding to a target A/F is obtained in accordance with the engine speed Ne and the engine loads L, and an output that requires further regeneration is obtained.

Figure 13:
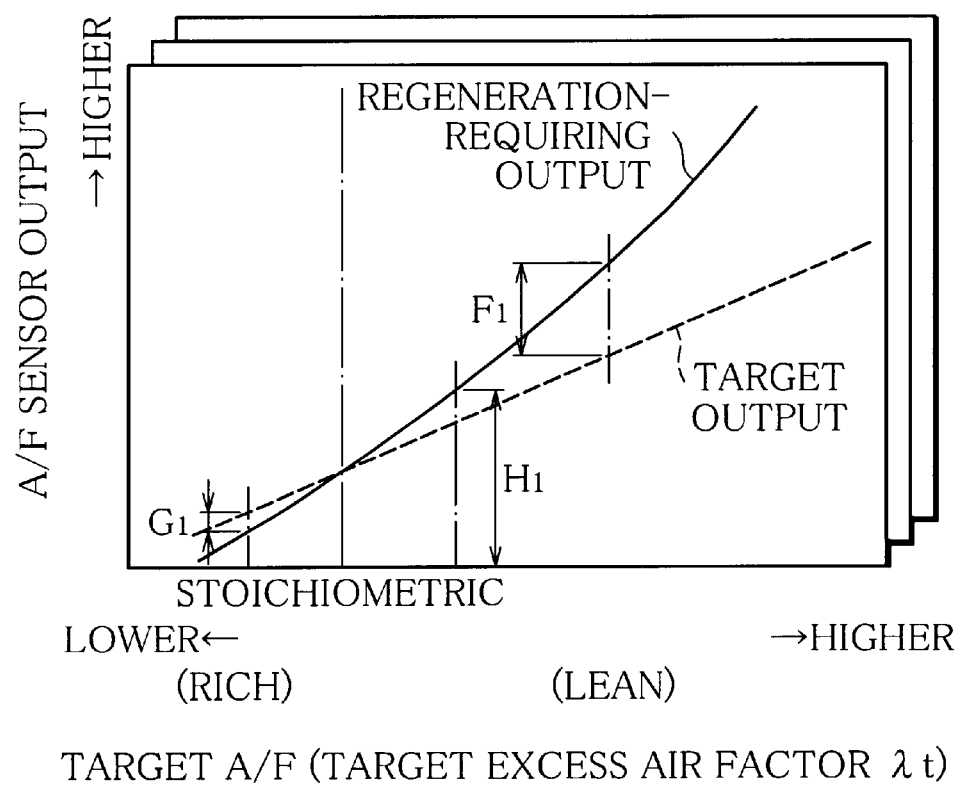
FIG. 13 shows maps showing relations between a target output (broken line) of the A/F sensor for the case where the exhaust pressure obtained when no PM is deposited on a DPF is adjusted to a reference exhaust pressure, an A/F sensor output (full line) for the case where the exhaust pressure is adjusted to a given high pressure that requires regeneration of the DPF, and a target A/F (target air-fuel ratio), that is, a target excess air factor $\lambda t$, set for an engine speed Ne and each engine load L.

Actually, a plurality of maps is provided in advance for the engine speed Ne and each engine load L, as shown in FIG. 13. These maps shown relations between the target output (broken line) of the A/F sensor for the case where the exhaust pressure obtained when no PM is deposited on the DPF (or when the DPF is not used) is adjusted to a reference exhaust pressure, the A/F sensor output (solid line) for the case where the exhaust pressure is adjusted to a given high pressure that requires regeneration of the DPF, and the target A/F (target air-fuel ratio), that is, the target excess air factor λt. A map that corresponds to the current engine speed Ne and engine loads L is extracted from those maps, and the target output of the A/F sensor and the A/F sensor output that requires regeneration, that is, a regeneration-requiring output, are obtained.

In Step S133, whether or not the deviation between the A/F sensor output and the target output is greater than the difference between the regeneration-requiring output and the target output of the A/F sensor, that is, a decision value $F_1$ shown in FIG. 13, is determined (A/F sensor output−target output>$F_1$?) with use of the same engine speed Ne and engine Loads L (same operating conditions) and the same lean atmosphere (same exhaust component concentration). If the decision is negative (No), that is, if the deviation is concluded to be not greater than the decision value $F_1$, it can be concluded that the exhaust pressure is not higher than an allowable pressure, and the quantity of deposited PM is not so large that regeneration of the DPF is not required yet. In this case, therefore, this routine is finished without doing anything.

If the decision in Step S133 is positive (Yes), that is, if the deviation is concluded to be greater than the decision value $F_1$, on the other hand, it can be concluded that the exhaust pressure is higher than the allowable pressure, and the DPF is just about to reach a PM capture limit, so that regeneration of the DPF is necessary. In this case, therefore, the program advances to Step S134, whereupon the execution of DPF regeneration is controlled.

Figure 14:
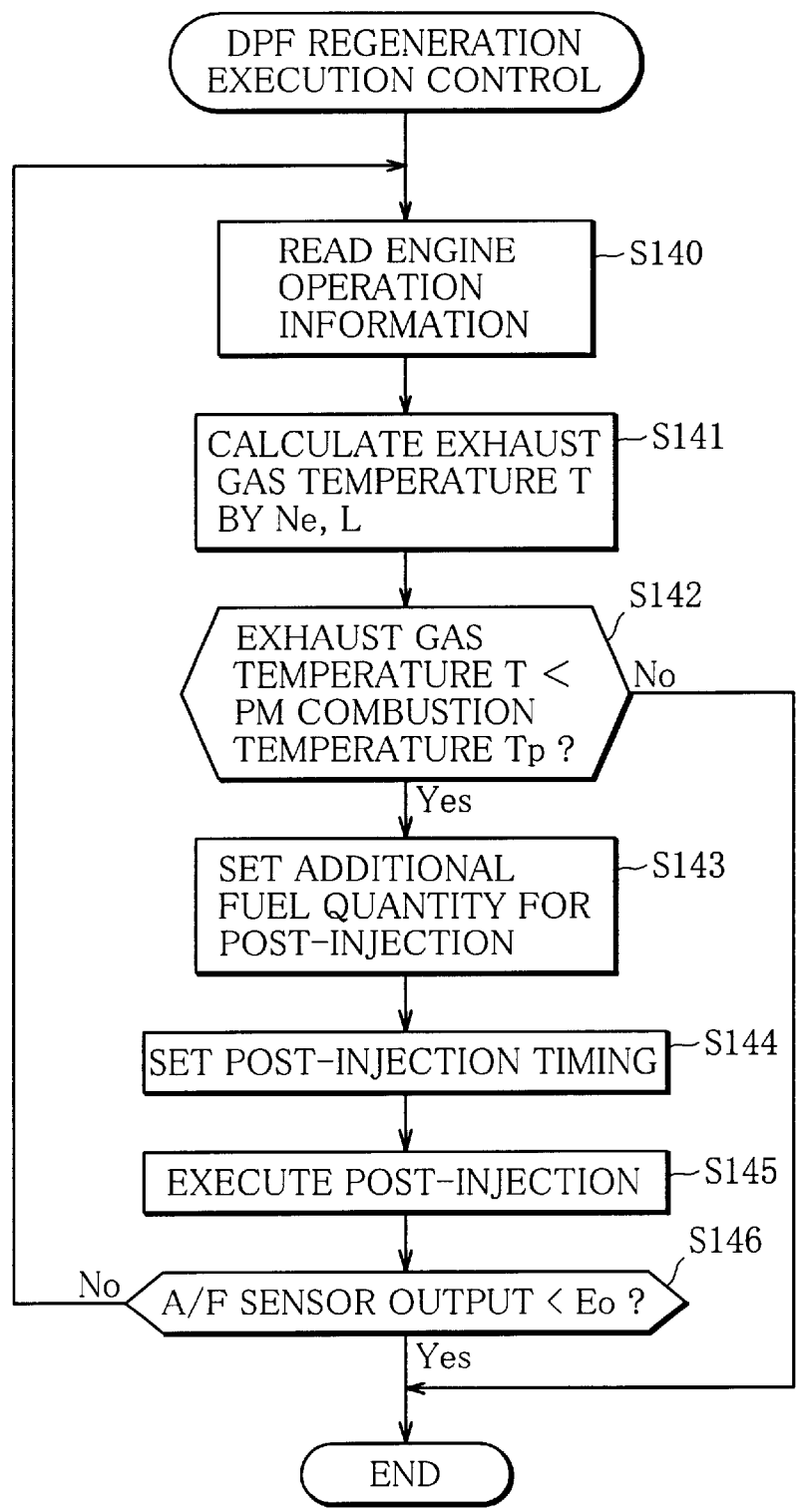
FIG. 14 is a flowchart showing a control routine for DPF regeneration execution control.

Referring to FIG. 14, there is shown a flowchart that illustrates a control routine for DPF regeneration execution control. The following is a description of the DPF regeneration execution control.

In Step S140, the operation information on the engine 101, that is, the engine speed Ne and the engine loads (accelerator opening, rack position for the case of a pre-stroke fuel injection pump, etc.) L, is read.

In Step S141, an exhaust gas temperature T corresponding to the engine speed Ne and the engine loads L are calculated on the basis of the engine speed Ne and the engine loads L.

In Step S142, whether or not the exhaust gas temperature T is lower than a PM combustion temperature Tp is determined. If the decision is negative (No), that is, if the exhaust gas temperature T is concluded to be not lower than the PM combustion temperature Tp, the PM is expected to be removed by combustion without any operation, so that this routine is finished. If the decision is positive (Yes), that is, if the exhaust gas temperature T is concluded to be lower than the PM combustion temperature Tp, on the other hand, the program advances to Step S143 and the subsequent steps, whereupon the post-injection (sub-injection) is carried out.

In the post-injection, the fuel is additionally supplied during the expansion or exhaust stroke after fuel injection for main combustion is carried out by means of the injectors 106, and the unburned fuel is discharged into the exhaust pipe 120. Thereupon, the additional fuel reacts with oxygen in the exhaust gas in the exhaust system. The resulting heat of reaction causes the temperature of the exhaust gas supplied to the DPF to rise, whereupon the PM on the DPF can be satisfactorily removed by combustion.

In Step S143, a proper additional fuel quantity is set in accordance with the deviation between the exhaust gas temperature T and the PM combustion temperature Tp before starting the post-injection.

In Step S144, a proper injection timing for satisfactory reaction of the additional fuel in the exhaust system is set in accordance with the exhaust gas temperature T in the expansion or exhaust stroke.

Then, in Step S145, the post-injection is carried out. More specifically, a proper quantity of additional fuel is injected from the injectors 106 at a proper time for injection. At the same time, the butterfly valve 142 is closed to restrain the exhaust flow in the exhaust system, thereby raising the exhaust pressure.

Thereupon, the relation between the unburned fuel and oxygen in the exhaust gas becomes intimate enough to accelerate the reaction in the exhaust system, so that exhaust heat-up is achieved rapidly, and the PM on the DPF is removed early by combustion. Even when the butterfly valve 142 is not closed, moreover, a satisfactory effect can be obtained, though the exhaust heat-up speed is low.

In Step S146, completion of the DPF regeneration is determined. In this case, for example, whether or not the A/F sensor output is smaller than a given $E_0$ is determined. The given value $E_0$ is previously adjusted to a value a little higher the target output (broken line) of FIG. 13 with use of the same engine speed Ne and engine loads L (same operating conditions) and the same lean atmosphere (same exhaust component concentration).

If the decision in Step S146 is negative (No), it can be concluded that the PM is not satisfactorily removed by combustion, and the execution of this routine is repeated. If the decision is positive (Yes), on the other hand, it can be concluded that the PM is satisfactorily removed by combustion to complete the DPF regeneration, whereupon the execution of this routine is finished.

Although the completion of the DPF regeneration is determined by comparing the A/F sensor output and the given value $E_0$ in this case, a given time for the satisfactory removal of the PM by combustion can be previously set so that the completion can be determined depending on whether or not the given time has passed since the start of the DPF regeneration.

The following is a description of a seventh embodiment.

In this seventh embodiment, as in the sixth embodiment, the A/F sensor is used as the exhaust sensor 122, and the pump-current formulas are applied in the same manner as aforesaid.

The seventh embodiment differs from the sixth embodiment only in a part of the DPF regeneration control routine, so that only differences from the sixth embodiment will be described in the following.

Figure 15:
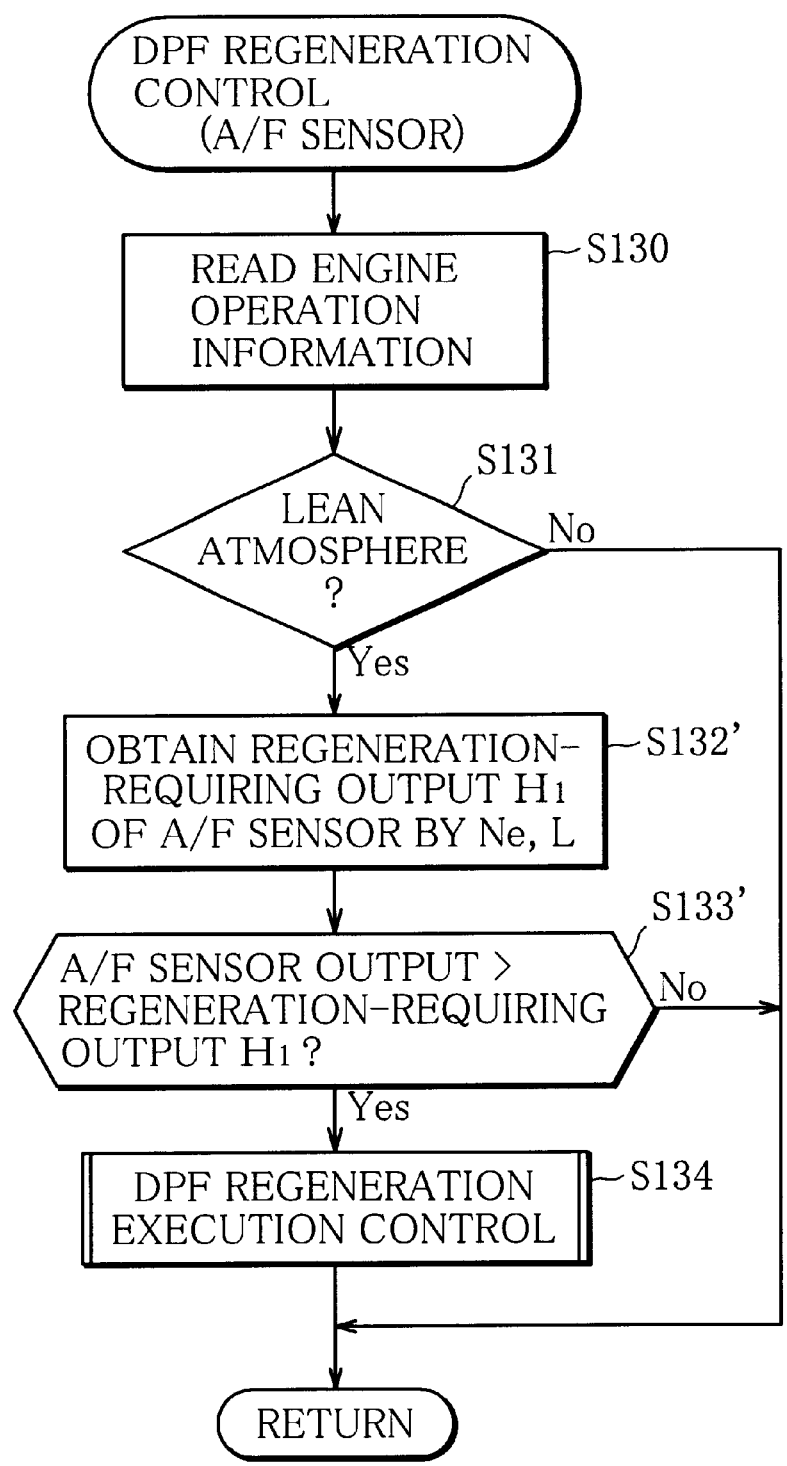
FIG. 15 is a flowchart showing a DPF regeneration control routine according to a seventh embodiment for the case where the A/F sensor is used.

Referring to FIG. 15, there is shown a flowchart that illustrates a DPF regeneration control routine according to the seventh embodiment using the A/F sensor. The differences from the sixth embodiment will now be mainly described with reference to this flowchart.

In Step S132', that follows Steps S130 and 131, the map that corresponds to the current engine speed Ne and engine loads L is extracted from the maps of FIG. 13, and the A/F sensor output (solid line of FIG. 13) corresponding to the given high pressure that requires regeneration of the DPF, that is, a regeneration-requiring output $H_1$, is selected according to the target A/F.

In Step S133', whether or not the A/F sensor output is greater than the regeneration-requiring output $H_1$ is determined with use of the same engine speed Ne and engine loads L (same operating conditions) and the same lean atmosphere (same exhaust component concentration). If the decision is negative (No), it can be concluded that the exhaust pressure is not higher than the allowable pressure, and the quantity of deposited PM is not so large that regeneration of the DPF is not required yet. In this case, therefore, this routine is finished without doing anything.

If the decision in Step S133' is positive (Yes), that is, if the A/F sensor output is concluded to be greater than the regeneration-requiring output $H_1$ (solid line of FIG. 13), on the other hand, it can be concluded that the DPF is just about to reach the PM capture limit, so that regeneration of the DPF is necessary. In this case, therefore, the program advances to Step S134, whereupon the execution of the DPF regeneration is controlled in the same manner as aforesaid.

The following is a description of an eighth embodiment.

Also in this eighth embodiment, as in the seventh embodiment, the A/F sensor is used as the exhaust sensor 122, and the pump-current formulas are applied in the same manner as aforesaid.

In the case of the eighth embodiment, the DPF is regenerated as the exhaust A/F is adjusted to a rich air-fuel ratio in order to release and reduce NOx that is occluded by the occlusion-type NOx catalyst 134.

Figure 16:
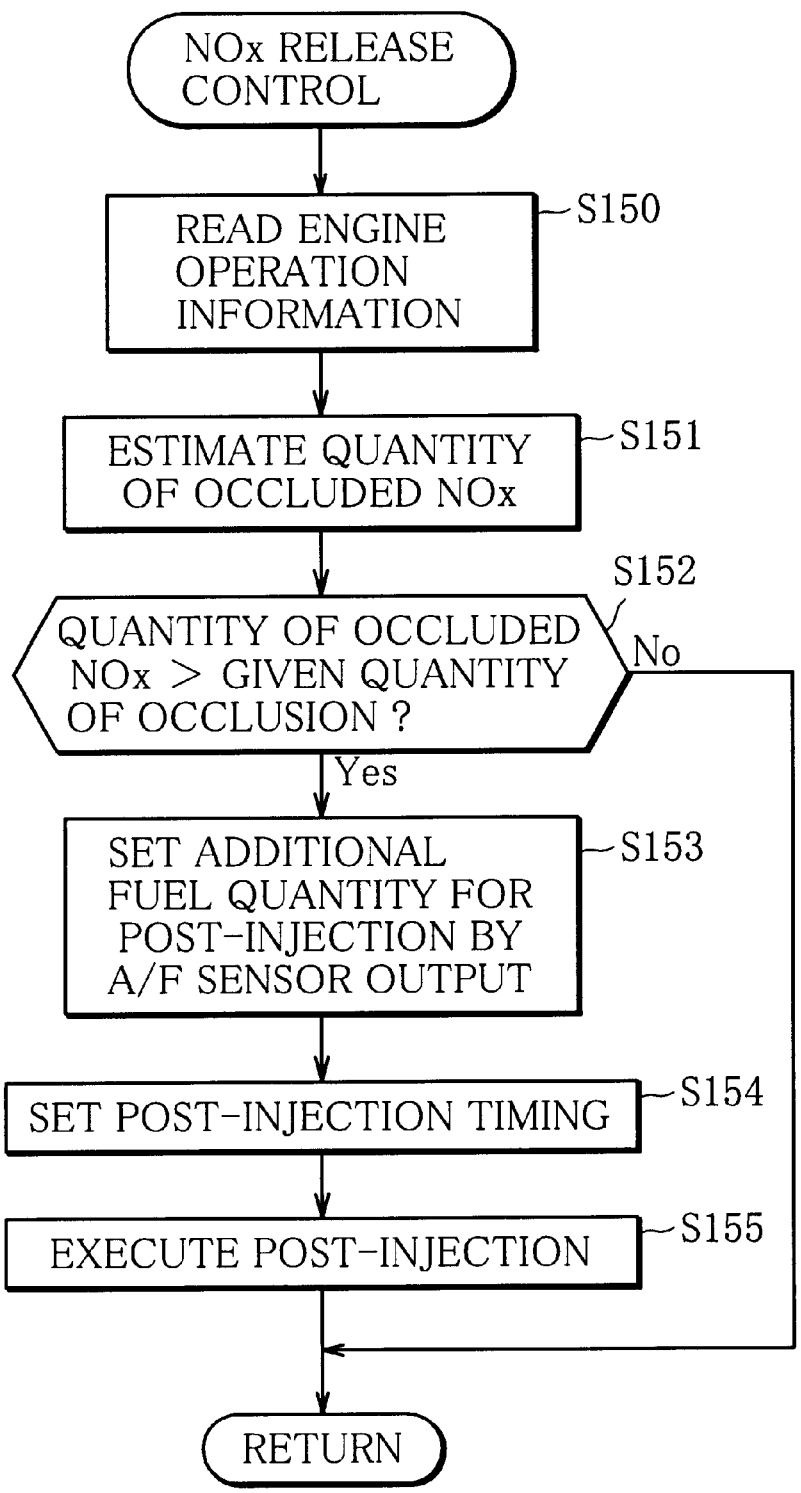
FIG. 16 is a flowchart showing a control routine for NOx release control according to the seventh embodiment.

Referring to FIG. 16, there is shown a flowchart that illustrates a control routine for NOx release control. The NOx release control will be described first.

In Step S150, the operation information on the engine 101, that is, the engine speed Ne and the engine loads (accelerator opening, rack position for the case of a pre-stroke fuel injection pump, etc.) L, is read in the same manner as aforesaid.

In Step S151, the quantity of NOx occluded by the occlusion-type NOx catalyst 134 is estimated. In this case, the quantity of occluded NOx increases in proportion to the operating time of the engine 101, for example, so that it is estimated in accordance with the operating time of the engine 101.

In Step S152, moreover, whether or not a given quantity of occlusion before saturation is exceeded by the estimated quantity of occluded NOx is determined. In this case, whether or not a given time corresponding to the given quantity of occlusion is exceeded by the operating time of the engine 101 is determined. If the decision is negative (No), this routine is finished. If the decision is positive (Yes), it is concluded that NOx must be released, whereupon the program advances to Step S153 and the subsequent steps.

In the case where NOx is released, the aforesaid post-injection is carried out. By doing this, the unburned fuel is discharged into the exhaust pipe 120 to adjust the exhaust A/F to a rich air-fuel ratio (or theoretical air-fuel ratio), so that the occlusion-type NOx catalyst 134 is brought into a rich atmosphere, whereupon NOx is released and reduced.

In Step S153, an additional fuel quantity is set in accordance with information from the A/F sensor in releasing NOx so that the exhaust A/F is a rich air-fuel ratio. The NOx can be released efficiently if the additional fuel quantity is set so that the air-fuel ratio is a rich air-fuel ratio for a given period and then a theoretical air-fuel ratio (stoichiometric) for another given period.

In Step S154, the exhaust gas temperature T corresponding to the engine speed Ne and the engine loads is calculated, and a proper injection timing such that the additional fuel can securely reach the occlusion-type NOx catalyst 134 can be set in accordance with the exhaust gas temperature T in the exhaust stroke. More specifically, the injection timing is set so that the additional fuel is injected as late as possible, e.g., in the latter stage of the exhaust stroke.

Then, in Step S155, the post-injection is carried out. More specifically, a proper quantity of additional fuel is injected from the injectors 106 at a proper time for injection. At the same time, the butterfly valve 142 is closed to restrain the exhaust flow in the exhaust system, thereby raising the exhaust pressure, and the EGR control of FIG. 11 is carried out to increase the EGR quantity Qegr. Thereupon, the quantity of new charge in the exhaust pipe 120 can be reduced, and the exhaust A/F can be enriched with ease.

Thus, NOx that is occluded by the occlusion-type NOx catalyst 134 can be satisfactorily released and reduced to regenerate the occlusion-type NOx catalyst 134.

Figure 17:
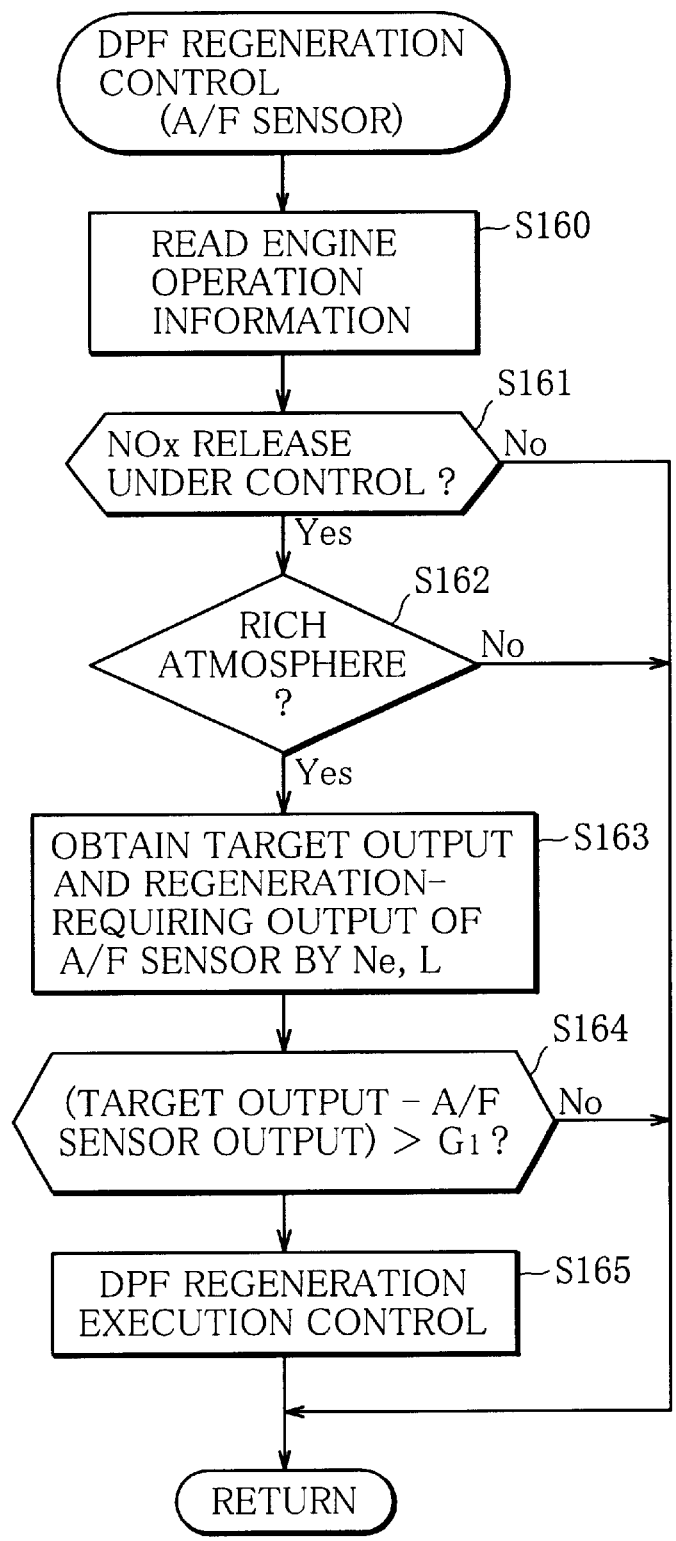
FIG. 17 is a flowchart showing a DPF regeneration control routine according to an eighth embodiment for the case where the A/F sensor is used.

Referring to FIG. 17, there is shown a flowchart that illustrates a routine for DPF regeneration control during the NOx release control. The following is a description of the DPF regeneration control during the NOx release control.

In Step S160, the operation information on the engine 101, that is, the engine speed Ne and the engine loads (accelerator opening, rack position for the case of a pre-stroke fuel injection pump, etc.) L, is read.

In Step S161, whether or not the NOx release control is being executed is determined. If the decision is negative (No), this routine is finished. If the decision is positive (Yes), on the other hand, the program advances to Step S162.

In Step S162, whether or not the exhaust A/F is a rich air-fuel ratio, that is, whether or not the exhaust gas is in a rich atmosphere, is determined in accordance with information from the A/F sensor. If the decision is negative (No), this routine is finished. If the decision is positive (Yes), on the other hand, the program advances to Step S163.

In Step S163, the target output of the A/F sensor corresponding to the target A/F is obtained in accordance with the engine speed Ne and the engine loads L, and the output that requires further regeneration is obtained.

Thus, as mentioned before, the map that corresponds to the current engine speed Ne and engine loads L is extracted from the maps shown in FIG. 13, and the target output of the A/F sensor and the A/F sensor output that requires regeneration, that the regeneration-requiring output, are obtained.

In Step S164, whether or not the deviation between the A/F sensor output and the target output of the A/F sensor is greater than the difference between the regeneration-requiring output and the target output, that is, a decision value $G_1$ shown in FIG. 13, is determined (target output–A/F sensor output>$G_1$?) with use of the same engine speed Ne and engine loads L (same operating conditions) and the same rich atmosphere (same exhaust component concentration). If the decision is negative (No), that is, if the deviation is concluded to be not greater than the decision value $G_1$, it can be concluded that the exhaust pressure is not higher than the allowable pressure, and the quantity of the deposited PM is not so large that regeneration of the DPF is required yet. In this case, therefore, this routine is finished without doing anything.

In the case where the butterfly vale 142 is closed during the NOx release control, the closed state of the butterfly valve 142 should preferably be added to the same operating conditions and the same exhaust component concentration as setting conditions for the decision If the decision in Step S164 is positive (Yes), that is, if the deviation is concludes to be greater than the decision value $G_1$, on the other hand, it can be concluded that the exhaust pressure is higher than the allowable pressure, and the DPF is just about to reach the PM capture limit, so that regeneration of the DPF is necessary. In this case, therefore, the program advances to Step S165, whereupon the execution of the aforesaid DPF regeneration is controlled.

The following is a description of a ninth embodiment.

In the case of this ninth embodiment, the $O_2$ sensor is used as the exhaust sensor 122. The aforementioned Nernst formula is applied to the case where the $O_2$ sensor is used.

In the case of the ninth embodiment, the DPF is regenerated by means of the $O_2$ sensor as the exhaust A/F is adjusted to a rich air-fuel ratio in order to release and reduce NOx that is occluded by the occlusion-type NOx catalyst 134.

Figure 18:
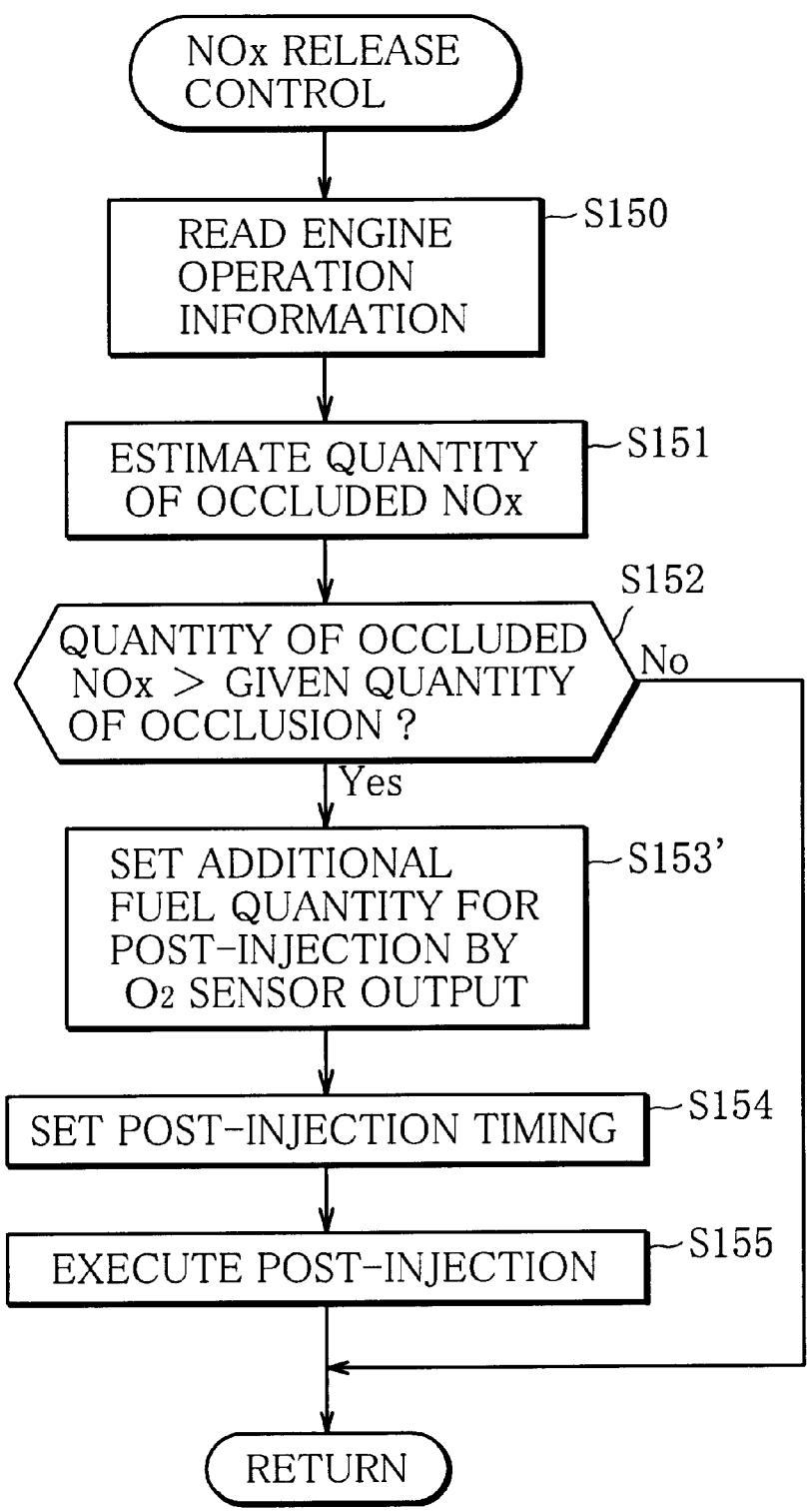
FIG. 18 is a flowchart showing a control routine for NOx release control according to a ninth embodiment.

Referring to FIG. 18, there is shown a flowchart that illustrates a control routine for NOx release control that resembles the one shown in FIG. 16. The NOx release control will be described first. Differences from the one shown in FIG. 16 will now be described in the main.

After Steps S150, S151, and S152 are executed, the post-injection is carried out in the same manner as aforesaid in Step S153' and the subsequent steps. By doing this, the unburned fuel is discharged into the exhaust pipe 120 to adjust the exhaust A/F to a rich air-fuel ratio (or theoretical air-fuel ratio), so that the occlusion-type NOx catalyst 134 is brought into a rich atmosphere, whereupon NOx released and reduced.

In Step S153', an additional fuel quantity is set in accordance with information from the $O_2$ sensor in releasing NOx so that the exhaust A/F is a rich air-fuel ratio. In this case, as in the aforesaid case, the NOx can be released efficiently if the additional fuel quantity is set so that the air-fuel ratio is a rich air-fuel ratio for a given period and then a theoretical air-fuel ratio (stoichiometric) for another given period.

Then, a proper injection timing is set in the exhaust stroke in Step S154, and the post-injection is carried out in Step S155. More specifically, the proper quantity of additional fuel is injected from the injectors 106 at the proper time for injection. At the same time, as in the aforesaid case, the butterfly valve 142 is closed to restrain the exhaust flow in the exhaust system, thereby raising the exhaust pressure, and the EGR control of FIG. 11 is carried out to increase the EGR quantity Qegr. Thereupon, the quantity of new charge in the exhaust pipe 120 can be reduced, and the exhaust A/F can be enriched with ease.

Thus, NOx that is occluded by the occlusion-type NOx catalyst 134 can be satisfactorily released and reduced to regenerate the occlusion-type NOx catalyst 134.

Figure 19:
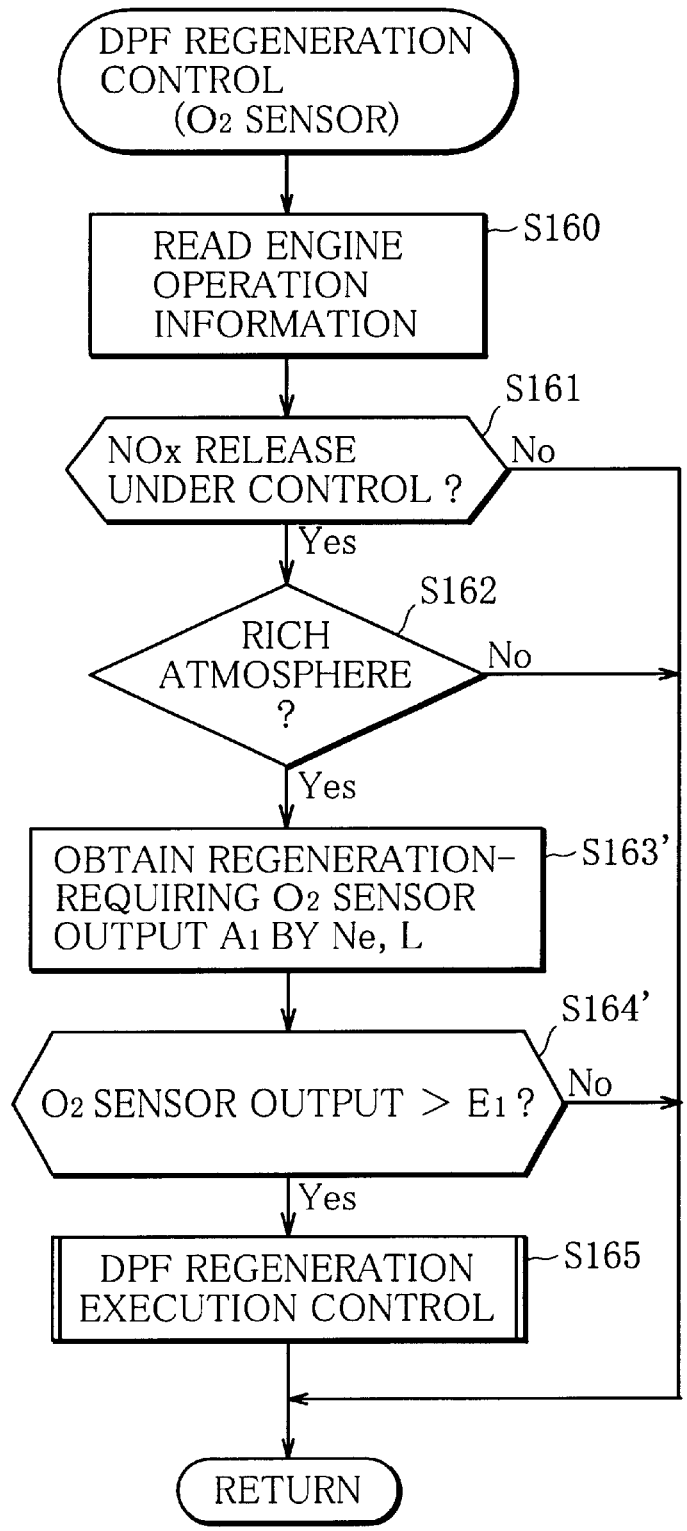
FIG. 19 is a flowchart showing a DPF regeneration control routine according to the ninth embodiment for the case where the $O_2$ sensor is used.

Referring to FIG. 19, there is shown a flowchart that illustrates a routine for DPF regeneration control during the NOx release control that resembles the one shown in FIG. 17. The following is a description of the DPF regeneration control during the NOx release control for the case where the $O_2$ sensor is used. Differences from the one shown in FIG. 17 will now be described in the main.

After Steps S160, S161, and S162 are executed, the program advances to Step S163'. In the case where the $O_2$ sensor is used, the execution of the NOx release control and the rich atmosphere are determined for the following reason. If the exhaust A/F is a rich air-fuel ratio, the $H_2$ partial pressure increases so that the $O_2$ sensor output is enhanced as the exhaust pressure rises. In the $O_2$ sensor, the extent of this change is higher than that of the change of the $O_2$ partial pressure with a lean air-fuel ratio, and is suited for the determination on the necessity of DPF regeneration. It is to be understood that the necessity of DPF regeneration in a lean atmosphere may be determined.

Figure 20:
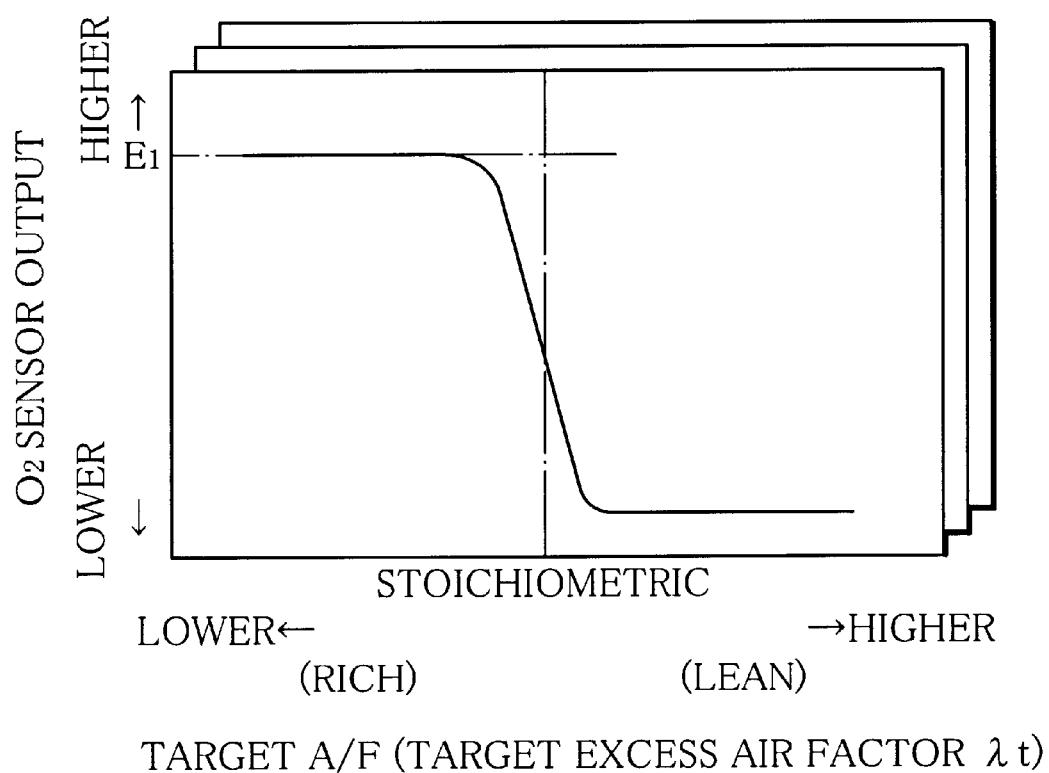
FIG. 20 is a map showing a given output El of the $O_2$ sensor that requires regeneration of the DPF, set for the engine speed Ne and each engine load L.

In Step S163', a map that corresponds to the current engine speed Ne and engine loads L is extracted from a plurality of maps (not shown) that are set in advance for the engine speed Ne and each engine load L and shown in FIG. 20, and a given output $E_1$ corresponding to the given high pressure that requires regeneration of the DPF is obtained In Step S164', whether or not the $O_2$ sensor output is greater than the given output $E_1$ is determined with use of the same engine speed Ne and engine Loads L (same operating conditions) and the same lean atmosphere (same exhaust component concentration). If the decision is negative (No), it can be concluded that the exhaust pressure is not higher than the allowable pressure, and the quantity of deposited PM is not so large that regeneration of the DPF is required yet. In this case, therefore, this routine is finished without doing anything.

If the decision in Step S164' is positive (Yes), that is, if the $O_2$ sensor output is concluded to be greater than the given output $E_1$, on the other hand, it can be concluded that the DPF is just about to reach the PM capture limit, so that regeneration of the DPF is necessary. In this case, therefore, the program advances to Step 5165, whereupon the execution of the DPF regeneration is controlled in the same manner as aforesaid.

In this case, whether or not the $O_2$ sensor output is greater than the given output $E_1$ is determined in the DPF regeneration control. Even in the case where the $O_2$ sensor is used, however, whether or not the deviation between the $O_2$ sensor output and the target output of the $O_2$ sensor is greater than the difference (decision value $E_2$) between the regeneration-requiring output and the target output may be determined as in the case of the sixth embodiment where the A/F sensor is used.

In the case where the butterfly valve 142 is closed during the NOx release control, the closed state of the butterfly valve 142 should preferably be added to the same operating conditions and the same exhaust component concentration as setting conditions for the decision value $E_1$.

The exhaust emission control device of the internal-combustion engine related to the regeneration of the post-exhaust processor of the present invention also comprises the exhaust flow control device 140 that has the same function with the foregoing exhaust flow control device 40 and the butterfly valve 142 that resembles the butterfly valve 42. Accordingly, fault diagnosis on the butterfly valve 142 can be carried out together with the determination on the necessity of DPF regeneration in accordance with information from the exhaust sensor 122.

What is claimed is:

1. An exhaust emission control device of an internal-combustion engine, comprising:
   exhaust emission control means located in an exhaust passage of the internal-combustion engine and adapted to reduce harmful substances in exhaust gas under a given exhaust pressure condition;
   an exhaust sensor, provided in the exhaust passage and upstream of said exhaust emission control means, for detecting and outputting the concentration of a specific exhaust component in said exhaust gas at an upstream of the exhaust emission control means, the output of the exhaust sensor being also indicative of an actual exhaust gas pressure upstream of said exhaust emission control means, and said exhaust sensor being the only exhaust sensor provided in the exhaust passage; and
   performance lowering identifying means for identifying lowering of the performance of said exhaust emission control means by detecting a failure to fulfill said given exhaust pressure condition based on the output of said exhaust sensor.

2. An exhaust emission control device of an internal-combustion engine according to claim 1, wherein said exhaust emission control means includes an exhaust flow control valve adapted to adjust the flow area of the exhaust passage, and said performance lowering identifying means identifies abnormality of said exhaust flow control valve.

3. An exhaust emission control device of an internal-combustion engine according to claim 1, wherein said performance lowering identifying means identifies lowering of the performance of said exhaust emission control means by comparing the output from said exhaust sensor and a target output with the same exhaust component concentration under a reference pressure.

4. An exhaust emission control device of an internal-combustion engine according to claim 1, wherein said exhaust sensor is adapted to detect at least two exhaust component concentrations and is adapted to detect the concentration of at least one specific exhaust component when the exhaust air-fuel ratio is a lean air-fuel ratio and to detect the respective concentrations of other specific exhaust components when the air-fuel ratio is a rich air-fuel ratio.

5. An exhaust emission control device of an internal-combustion engine according to claim 1, wherein said exhaust emission control means is a post-exhaust processor, and said performance lowering identifying means determines the necessity of regeneration of said post-exhaust processor.

6. An exhaust emission control device of an internal-combustion engine according to claim 5, wherein said performance lowering identifying means sets a decision value for determining the necessity of regeneration of said post-exhaust processor in accordance with the operating conditions of the internal-combustion engine and said specific exhaust component concentration, and determines the necessity of regeneration of said post-exhaust processor by comparing the output of said exhaust sensor and said decision value using the same operating conditions and the same exhaust component concentration.

7. An exhaust emission control device of an internal-combustion engine according to claim 5, wherein said exhaust sensor is an $O_2$ sensor, said post-exhaust processor includes an occlusion-type NOx catalyst, and said performance lowering identifying means determines the necessity of regeneration of said post-exhaust processor when the exhaust air-fuel ratio is adjusted to a rich air-fuel ratio in order to release NOx from said occlusion-type NOx catalyst.

8. An exhaust emission control device of an internal-combustion engine according to claim 5, wherein said performance lowering identifying means sets, in accordance with the operating conditions of the internal-combustion engine, a target output under a reference exhaust pressure with said post-exhaust processor nonoperating, sets a decision value for determining the necessity of regeneration of said post-exhaust processor in accordance with the exhaust component concentration, and concludes that regeneration of said post-exhaust processor is necessary if the deviation between the output of said exhaust sensor and said target output exceeds said decision value with the same operating conditions and the same exhaust component concentration.

9. An exhaust emission control device of an internal-combustion engine according to claim 5, wherein said exhaust sensor is a linear air-fuel ratio sensor, and said performance lowering identifying means determines the necessity of regeneration of said post-exhaust processor when the exhaust air-fuel ratio is a lean air-fuel ratio during injection quantity feedback control using said linear air-fuel ratio sensor and based on the excess air factor of the internal-combustion engine.

10. An exhaust emission control device of an internal-combustion engine according to claim 5, wherein said exhaust sensor is a linear air-fuel ratio sensor, said post-exhaust processor includes an occlusion-type NOx catalyst, and said performance lowering identifying means determines the necessity of regeneration of said post-exhaust processor when the exhaust air-fuel ratio is adjusted to a rich air-fuel ratio in order to release NOx from said Occlusion-type NOx catalyst.

11. An exhaust emission control device of an internal-combustion engine, comprising:
   exhaust emission control means located in an exhaust passage of the internal-combustion engine and adapted to reduce harmful substances in exhaust gas under a given exhaust pressure condition;
   an exhaust sensor for detecting the concentration of a specific exhaust component in said exhaust gas; and
   performance lowering identifying means for identifying lowering of the performance of said exhaust emission control means by detecting a failure to fulfill said given exhaust pressure condition in accordance with the output of said exhaust sensor,
   wherein said exhaust emission control means is a post-exhaust processor, and said performance lowering identifying means determines the necessity of regeneration of said post-exhaust processor, and
   wherein said exhaust sensor is a linear air-fuel ratio sensor, and said performance lowering identifying means determines the necessity of regeneration of said post-exhaust processor when the exhaust air-fuel ratio is a lean air-fuel ratio during exhaust reflux feedback control using said linear air-fuel ratio sensor.

12. An exhaust emission control device of an internal-combustion engine, comprising:

exhaust emission control means located in an exhaust passage of the internal-combustion engine and adapted to reduce substances in exhaust gas under a given exhaust pressure condition;

an exhaust sensor for detecting the concentration of a specific exhaust component in said exhaust gas; and performance lowering identifying means for identifying lowering of the performance of said exhaust emission control means by detecting a failure to fulfill said given exhaust pressure condition in accordance with the output of said exhaust sensor, wherein said performance lowering identifying means identifies lowering of the performance of said exhaust emission control means in accordance with relations between a plurality of outputs with different exhaust component concentrations from said exhaust sensor and a plurality of target outputs with said individual exhaust component concentrations under the reference pressure.

* * * * *